United States Patent
Bowles

[15] 3,683,166
[45] Aug. 8, 1972

[54] FLUIDIC SYSTEMS HAVE ADAPTIVE GAIN DEPENDENT UPON INPUT SIGNAL PARAMETERS

[72] Inventor: Romald E. Bowles, Silver Spring, Md.

[73] Assignee: Bowles Engineering Corporation, Silver Spring, Md.

[22] Filed: Jan. 20, 1970

[21] Appl. No.: 4,315

[52] U.S. Cl.................................235/200, 137/81.5
[51] Int. Cl.................................................G06d 1/08
[58] Field of Search..............235/200, 201; 137/81.5

[56] References Cited

UNITED STATES PATENTS

| | | | |
|---|---|---|---|
| 3,530,870 | 9/1970 | Hoglund | 137/81.5 |
| 3,459,206 | 8/1969 | Dexter | 137/81.5 |
| 3,228,602 | 1/1966 | Boothe | 235/201 |
| 3,500,847 | 3/1970 | Doherty | 137/81.5 |
| 3,285,264 | 11/1966 | Boothe | 137/81.5 |
| 3,547,138 | 12/1970 | Kelley et al. | 137/81.5 |
| 3,451,410 | 6/1969 | Boothe | 137/81.5 |
| 3,458,129 | 7/1969 | Woodson | 235/200 |
| 3,461,899 | 8/1969 | Di Camillo | 137/81.5 |
| 3,500,848 | 3/1970 | Kelley | 137/81.5 |

*Primary Examiner*—Richard B. Wilkins
*Assistant Examiner*—Lawrence R. Franklin
*Attorney*—Rose & Edell

[57] ABSTRACT

Techniques are disclosed whereby the output signal versus input signal characteristic of a fluidic circuit is varied in response to changes in a predetermined parameter of the input signal. In various embodiments disclosed the input signal parameter of interest is the average amplitude, magnitude of amplitude fluctuations with respect to average amplitude, frequency of amplitude fluctuations from average amplitude, average magnitude of fluctuations from average amplitude, average frequency of amplitude fluctuations from average amplitude, first or higher order derivatives with respect to time of the input signal amplitude, phase, amplitude or frequency, frequency difference between two input signals, difference between derivatives with respect to time of amplitude, frequency or phase of two or more input signals, or any combination of the above.

41 Claims, 9 Drawing Figures

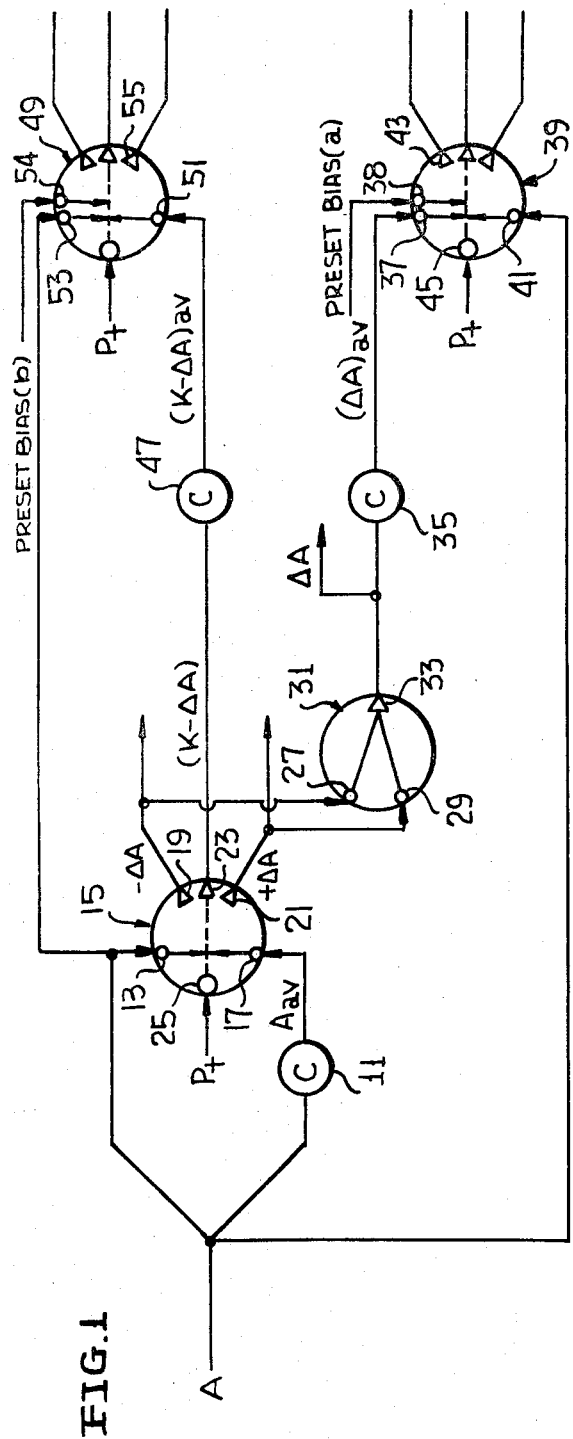
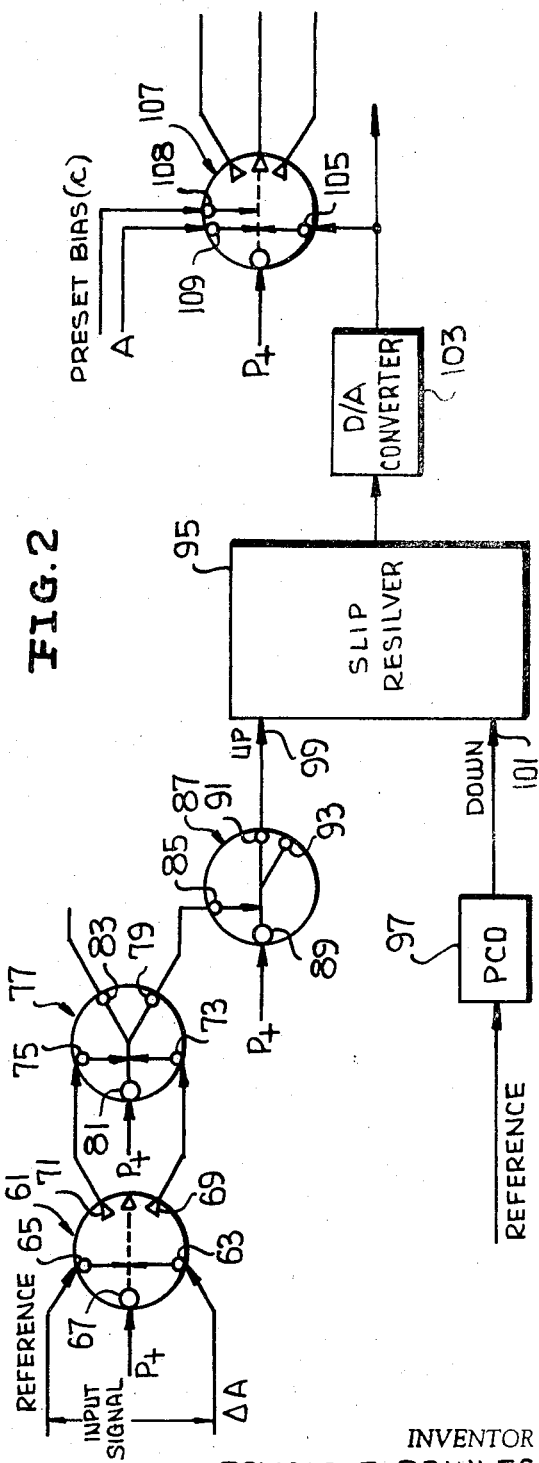
FIG.1
FIG.2
INVENTOR
ROMALD E. BOWLES
BY Hurvitz & Rose
ATTORNEYS

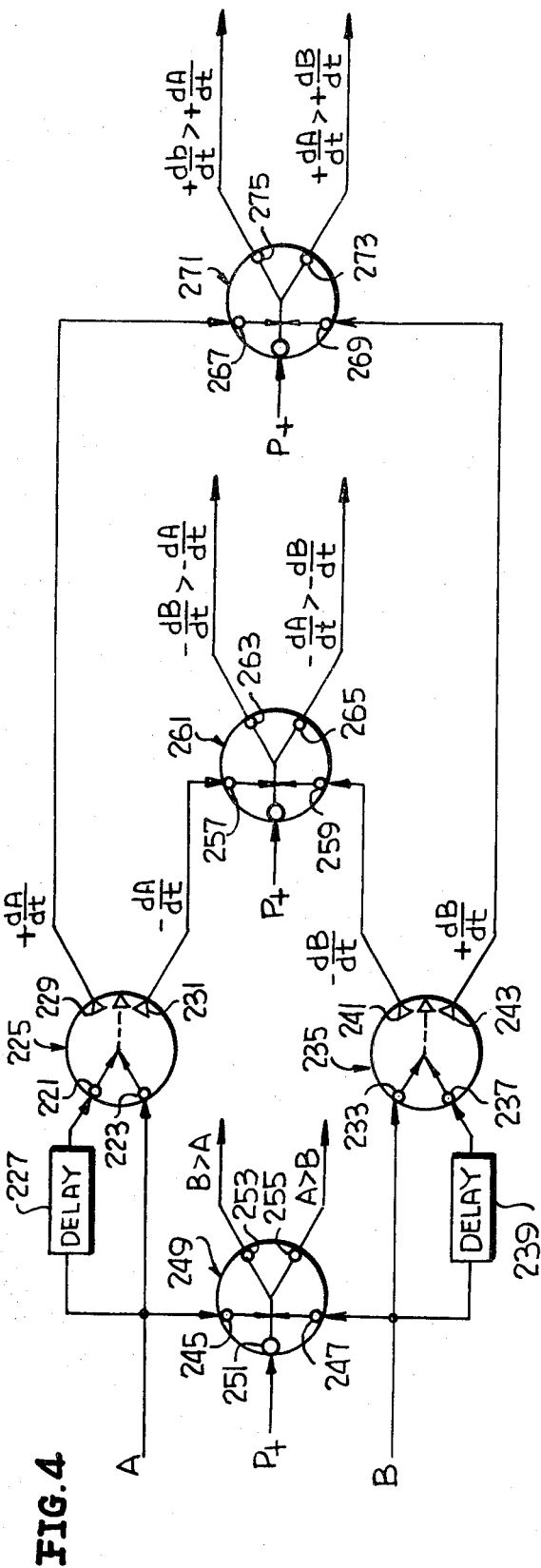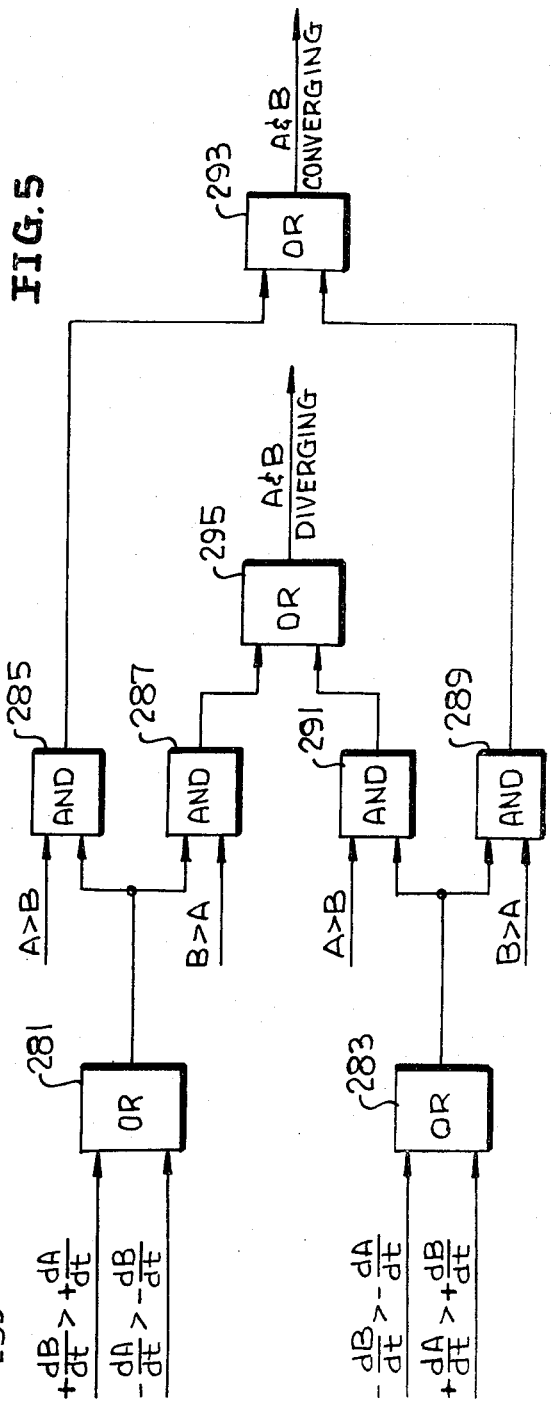

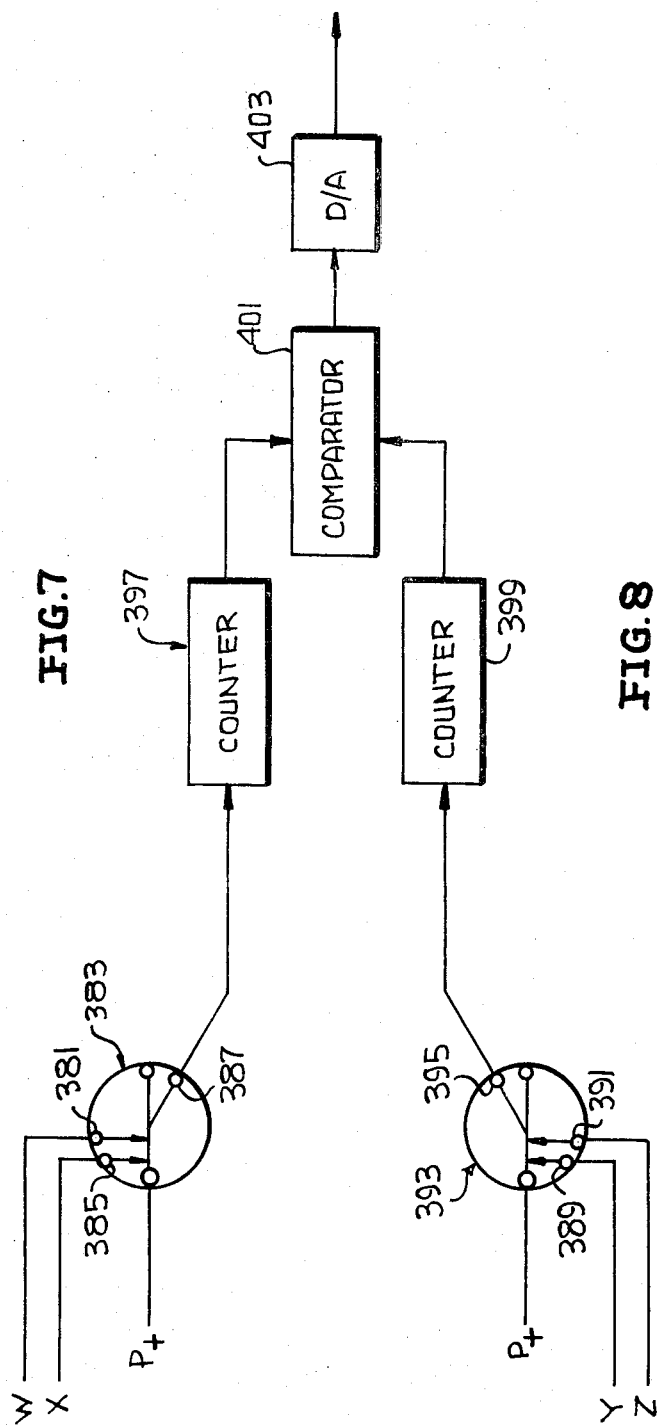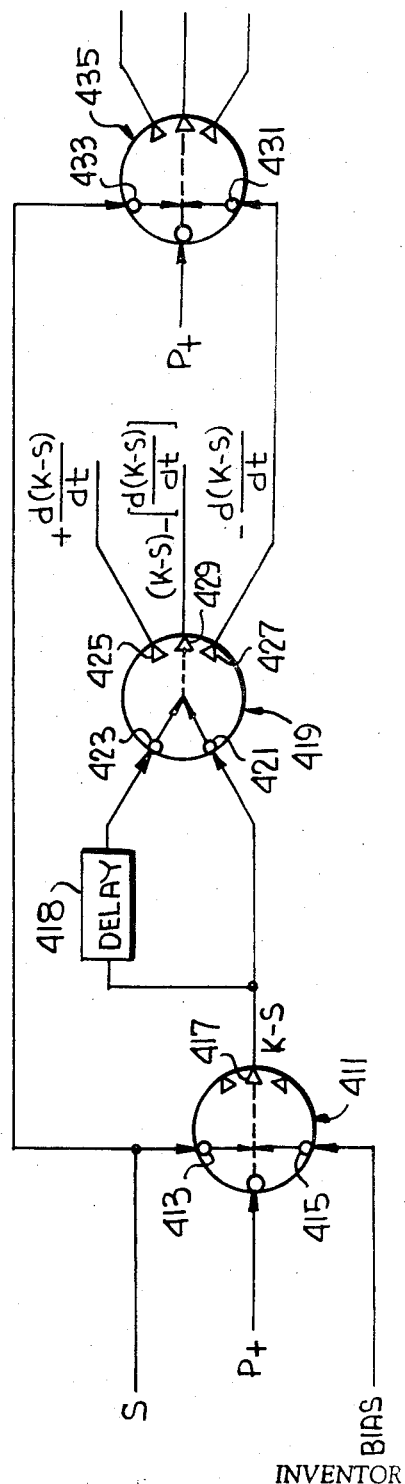
FIG.7
FIG.8

FLUIDIC SYSTEMS HAVE ADAPTIVE GAIN DEPENDENT UPON INPUT SIGNAL PARAMETERS

BACKGROUND OF THE INVENTION

The present invention relates to self-adaptive fluidic systems and more particularly to fluidic systems having an output signal versus input signal characteristic which is selectively variable in response to variations of a predetermined parameter of the system input signal.

In my U.S. Pat. Nos. 3,542,048 and 3,586,020 I describe self-adaptive systems in which amplifier gain characteristics are selectively varied in response to variations of system parameters. The feature of self-adaptability is described as enabling a system to:

1. optimize its own performance when operating under anticipated operating conditions;
2. accommodate changes in operating requirements;
3. extend the system operating conditions to provide performance capabilities of the system not originally anticipated. Generally a control system can be described mathematically by transfer functions which relate the input and output signals. In a conventional system this transfer function is a compromise selected by the designer and is fixed at the time the system is assembled. The fixed transfer function enables the system to operate adequately within an anticipated range of operating conditions. The conventional system also provides optimized performance for selected points within this range, these points corresponding to the designer's original predictions of the most probable or most frequently encountered operating conditions. In an adaptive control system of the type with which this invention is concerned, these transfer functions can be modified on command while the system is operating.

The present invention is concerned with techniques for generating fluid command signals suitable for application to fluidic elements or circuits for the purpose of modifying the output signal versus input signal characteristic of those elements or circuits as the case may be. The particular elements or circuits to which the command signals are applied form no part of the present invention. Rather such elements or circuits may be any of those disclosed in either of my above-referenced U.S. Pat. Nos. 3,542,048 or 3,586,020, or in U.S. Pat. No. 3,601,137 to Peter Bauer, or in any fluidic element or system having an output signal versus input signal characteristic which is selectively variable in response to a fluid command signal.

More particularly, the command signals provided in accordance with the present invention are dependent upon predetermined parameters of the fluid input signals applied to the element or circuit which is to have its output signal versus input signal characteristic varied.

It is therefore an object of the present invention to provide techniques whereby the output signal versus input signal characteristic of a fluidic element or circuit is rendered variable in response to variations of a predetermined parameter of the fluid input signal.

It is another object of the present invention to provide specific circuits for generating fluid signals having amplitudes which vary in response to various predetermined parameters of a fluid input signal.

It is another object of the present invention to provide fluidic circuitry for generating fluid command signals having amplitudes which vary in response to variable parameters of one or more fluid input signals, the fluid command signal being utilized to selectively vary the output signal versus input signal characteristic of a fluidic circuit or element.

SUMMARY OF THE INVENTION

In accordance with the present invention fluid command signals of variable amplitude are utilized to vary the output signal versus input signal characteristic of a fluidic element or circuit. The amplitude of the fluid command signal is dependent upon one or more parameters of the fluid input signal.

In one aspect of the present invention the fluid command signal represents the average amplitude of the fluid input signal and is generated by integrating the fluid input signal pressure by means of a fluidic capacitor, the output from which provides a fluid command signal dependent upon the average amplitude or average pressure of the fluid input signal.

In a second embodiment of the present invention a fluid command signal is generated as a function of the magnitude of input signal amplitude fluctuations from the average input signal amplitude. This command signal is achieved by applying the input signal and a signal representing the average amplitude of the input signal to opposed control nozzles of a proportional fluidic amplifier so that the output signal from the amplifier represents the deviation of the input signal from its average value.

In another embodiment of the present invention a fluid command signal is provided in accordance with the average amplitude of fluctuation of the input signal from its average amplitude. This command signal is provided by integrating the previously described command signal which is dependent upon amplitude fluctuations of the input signal from the average input signal amplitude.

In another embodiment of the present invention a fluid command signal is derived in response to the frequency of amplitude fluctuations of the input signal from the average input signal amplitude. This latter command signal is achieved by providing a pulse in response to each fluctuation of the input signal amplitude from its average amplitude and then converting the frequency of the pulses thus produced to an analog signal having an amplitude which varies in accordance with said frequency. Still another command signal is generated in response to the average frequency of fluctuations of the input signal amplitude from its average value by counting the pulses representing amplitude fluctuations and comparing the accumulated pulse count with the count produced in response to a reference pulse frequency. The difference in counts represents a measure of the average frequency of input signal amplitude deviations from the average amplitude.

In still another embodiment of the present invention a fluid command signal is generated in response to the first or higher order derivatives with respect to time of the input signal amplitude. This is accomplished by sequentially differentiating the input signal as many times as is required to provide the requisite order of derivative.

In another embodiment of the present invention a digital fluid command signal is generated in response to two fluid input signals having slopes of the same polarity; in the alternative a digital signal is generated in response to two input signals having slopes of different polarity. These signals are achieved through utilization of fluidic digital logic elements connected in circuit to produce the requisite command signal. A still further fluid command signal may be generated by integrating either of the two above described digital command signals whereby to provide a measure of the average frequency with which the input signal slopes have different or similar slope polarities.

In a still further embodiment of the present invention a fluid command signal is provided in accordance with which of two fluid input signals has a higher amplitude or in the alternative which of two fluid input signals has a greater instantaneous rate of change in amplitude.

In a still further alternative, fluidic logic techniques are utilized to provide fluid command signals in accordance with whether or not a pair of fluid inputs signals are diverging, or are converging, or have equal frequencies, or have unequal frequencies, etc.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 1 is a schematic diagram of a fluidic circuit for generating fluid command signals in response to average input signal amplitude and fluctuation of the input signal from its average amplitude.

FIG. 2 is a schematic diagram of a fluidic circuit for providing a fluid command signal in response to the frequency of fluctuation of an input signal from its average amplitude.

FIG. 4 is a schematic diagram of a fluidic circuit for providing binary fluid command signals indicating which of two fluid input signals has a greater amplitude and which of two input signals has a greater rate of change of amplitude.

FIG. 5 is a schematic diagram of a fluidic circuit for providing binary fluid command signals in response to the convergence and divergence of the amplitudes of two input signals.

FIG. 7 is a schematic diagram of a fluidic circuit for providing a fluid command signal as a measure of the difference in frequency between plural input signals.

FIG. 8 is a schematic diagram of a fluidic circuit for providing a fluid command signal which varies inversely with input signal amplitude, and a fluid command signal which varies inversely with the rate of change of input signal amplitude.

DETAILED DESCRIPTION OF THE PREFERRED EMBODIMENTS

Figure 3:
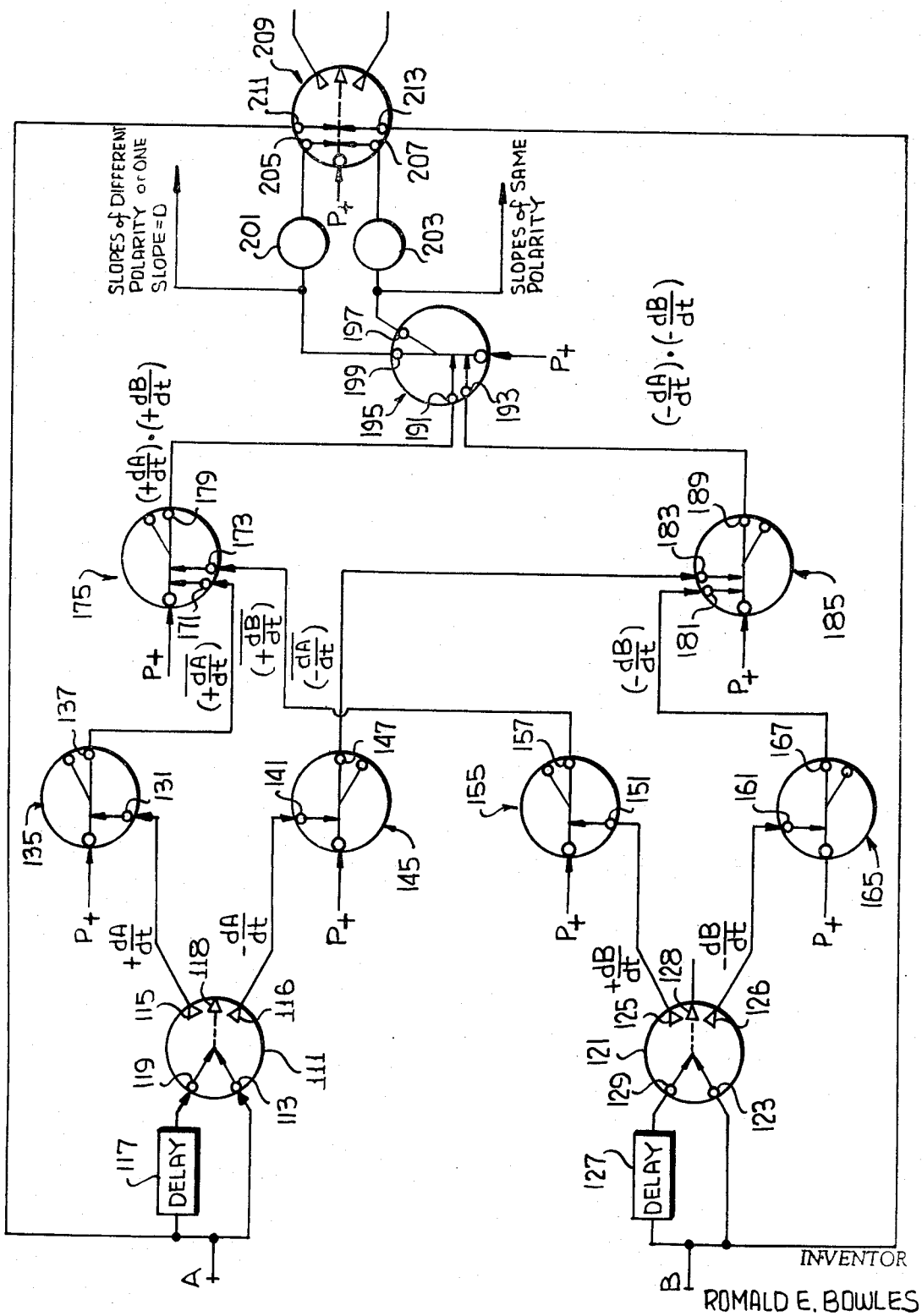
FIG. 3 is a schematic diagram of a fluidic circuit for providing binary fluid command signals indicating relative polarities of the time derivatives of two fluid input signals, and for providing an analog fluid command signal representing the average frequency of the simultaneous occurrence of like and unlike polarities in the slopes of two input signals.

Referring now to FIG. 1 of the accompanying drawings there is illustrated a circuit employing techniques of the present invention by which a number of fluid command signals are generated. A fluid input signal A is applied simultaneously to a fluidic capacitor 11 and to a left control nozzle 13 of a proportional fluidic amplifier 15. Capacitor 11, by way of example, be of the type disclosed in my co-pending U.S. Pat. application Ser. No. 650,106 filed on June 29, 1967 entitled "Fluidic Capacitors." Fluidic amplifier 15, by way of example, may be of the type illustrated in U.S. Pat. No. 3,275,013. Capacitor 11 serves as an integrator for the input signal A and as such provides an output signal pressure representative of the average pressure of input signal A. This output signal is denoted as $A_{av}$ in FIG. 1 and is applied to right control nozzle 17 of amplifier 15. Amplifier 15 is provided with left output passage 19 central output passage 23 and right output passage 21. For purposes of the present invention, passages 19 and 21 are considered as being symmetrical about passage 23.

Considering now the operation of amplifier 15, the output signal provided at right output passage 21 varies in proportion to the amplitude of the input signal A applied to left control nozzle 13. Signal $A_{av}$ applied to right control nozzle 17 acts in opposition to signal A to selectively vary the deflection effect produced on the amplifier power stream by signal A. In this manner, signal $A_{av}$ serves as a fluid command signal which selectively varies the gain of amplifier 15 in accordance with the average pressure of input signal A. When signal $A_{av}$ is utilized thusly as a gain command signal, its pressure is usually dropped somewhat (as by a restrictor element, not illustrated) from the actual average pressure of input signal A in order that signal $A_{av}$, when applied to control nozzle 17 does not completely override power stream deflections by signal A; rather, gain command signal $A_{av}$ selectively lessens the deflection effect produced by signal A at control nozzle 13.

In the case where the pressure of $A_{av}$ is not dropped prior to application to right control nozzle 17, the output signal provided at right output passage 21 has an amplitude which varies in accordance with the magnitude of amplitude fluctuations of input signal A above the average amplitude of input signal A. This signal at output passage 21 is denoted as $+\Delta A$ in FIG. 1. The generation of signal $+\Delta A$ may be better understood by considering the fact that in the absence of a pressure differential across the amplifier power stream issued from power nozzle 25, the power stream is directed toward central output passage 23. When the amplitude of input signal A is equal to the average amplitude of signal A, the signals at left and right control nozzle 13 and 17 respectively are of equal amplitude and therefore the pressure differential applied across the power stream is zero. When the amplitude of input signal A increases above its average value, the amplitude of the signal at control nozzle 13 exceeds that at control nozzle 17, and a net output pressure is provided at right output passage 21. The pressure thus provided at output passage 21 clearly is a measure of the amount by which the amplitude of signal A exceeds the average amplitude of signal A. The signal $+\Delta A$ may itself be utilized as a fluid command signal for modifying the gain or other output signal versus input signal characteristic of a fluidic circuit or amplifier element.

Similarly, the output signal provided at left output passage 19 of amplifier 15 is denoted as $-\Delta A$ and has an amplitude which varies in accordance with the magnitude of fluctuations of the amplitude of signal A below the average value of the amplitude of signal A. This is because the power stream issuing from power nozzle 25 is directed toward central output passage 23 when the amplitude of signal A is equal to the average amplitude of signal A. If the amplitude of signal A falls below its average amplitude the amplitude of signal $A_{av}$ at right control nozzle 17 exceeds the amplitude signal A applied to left control nozzle 13 and a pressure output signal is provided at left output passage 19.

Signal $-\Delta A$ may be utilized as a fluid command signal to control the gain or other output signal versus input signal characteristic of a fluidic amplifier or fluidic circuit in accordance with the principles of the present invention. In addition the differential pressure appearing across output passages 21 and 19 may be considered a differential pressure command signal which varies in magnitude and sense in accordance with amplitude fluctuations of input signal A from its average pressure.

Output passages 19 and 21 of amplifier 15 are connected to input ports 27 and 29 respectively of a maximum pressure selector unit 31. Maximum pressure selector unit 31, by way of example, may be of the type described in my U.S. Pat. No. 3,411,520. The output pressure provided at output passage 33 of maximum pressure selector unit 31 is equal to the highest of the two pressures applied to input ports 27 and 29. The output signal thus provided at output passage 33 may be termed $\Delta A$ and has a pressure which corresponds to the amplitude of fluctuations of either polarity of signal A from its average amplitude. More specifically, the amplitude of signal $\Delta A$ varies in proportion to the amplitude difference between signal A and signal $A_{av}$, regardless of which of signals A and $A_{av}$ is of greater amplitude. Signal $\Delta A$ may be utilized as a fluid command signal in accordance with the principles of the present invention.

Signal $\Delta A$ is applied to a fluidic capacitor 35 of the same general type as capacitor 11 and which integrates signal $\Delta A$ to provide an output signal $(\Delta A)_{av}$ representing the average value of signal $\Delta A$. More specifically, the amplitude of signal $(\Delta A)_{av}$ is proportional to the average amplitude difference between signals A and $A_{av}$. Signal $(\Delta A)_{av}$ may be utilized as a fluid command signal in accordance with the principles of the present invention. Such utilization is illustrated in FIG. 1 whereby signal $(\Delta A)_{av}$ is applied to left control nozzle 37 of fluidic amplifier 39, the latter being of the same general type and configuration as amplifier 15. Signal A is applied to right control nozzle 41 of amplifier 39. An adjustable preset bias signal (a) is applied to a further left control nozzle 38 to permit quiescent balancing of signals A and $(\Delta A)_{av}$ to the degree desired. Left output passage 43 of amplifier 39 receives a power stream issued from power nozzle 45 as a function of the pressure of signal A applied to control nozzle 41. This function is selectively modified by signal $(\Delta A)_{av}$ acting in opposition to signal A and thereby acting as a fluid gain command signal. Of course it will be understood that amplifier 39 is merely intended to be representative of a fluidic element or fluidic circuit in which the output versus input signal characteristic is variable in response to the particular command signal, in this case $(\Delta A)_{av}$.

Where, as assumed here, signal $A_{av}$ is maintained at full pressure at control nozzle 17, whenever signal A is equal to its average amplitude the power stream from power nozzle 25 is directed towards central output passage 23. The resulting signal at output passage 23 represents an inverse function of amplitude fluctuations of signal A. More particularly, the signal at output passage 23, denoted as $(K-\Delta A)$ in FIG. 1, is at a maximum amplitude (K) whenever the amplitude of signal A is equal to the average amplitude of signal A (as represented by signal $A_{av}$). Fluctuations in the amplitude of signal A from its average amplitude in either sense produce amplitude decreases in the signal $(K-\Delta A)$ at central output passage 23. The amplitude decreases of signal $(K-\Delta A)$ are proportional to the magnitude of the amplitude fluctuation of signal A. The signal $(K-\Delta A)$ of course can be utilized as a fluid command signal in accordance with the principles of the present invention. Signal $(K-\Delta A)$ is applied to a fluidic capacitor 47 of the same general type as the capacitors 11 and 35 described hereinabove. Capacitor 47 serves to integrate signal $(K-\Delta A)$ so that the output signal from the capacitor, $(K-\Delta A)_{av}$, represents the average pressure of signal $(K-\Delta A)$. More specifically, signal $(K-\Delta A)_{av}$ is a fluid command signal which varies as an inverse function of the average amplitude of fluctuations of the input signal amplitude from its average value $(A_{av})$. By way of illustration of utilization of signal $(K-\Delta A)_{av}$ as a fluid command signal in accordance with the principles of the present invention, said signal is applied to right control nozzle 51 of fluidic amplifier 49, the latter being of the same general type as amplifiers 39 and 15 described hereinabove. Signal A and preset bias signal (b) are applied to left control nozzles 53 and 54 respectively of amplifier 49. The output signal provided at right output passage 55 of amplifier 49 varies as a function of input signal A, which function is selectively modified in accordance with the amplitude of command signal $(K-\Delta A)_{av}$.

Referring now to FIG. 2 of the accompanying drawings there is illustrated in schematic form a circuit in which the frequency of fluctuations of an input signal from its average amplitude is utilized to provide fluid command signals in accordance with the principles of the present invention. The particular input signal employed for the circuit of FIG. 2 is signal $\Delta A$ of FIG. 1 which has an amplitude proportional to the average amplitude of fluctuations of the amplitude of signal A from its average amplitude (represented by signal $A_{av}$). This of course is only by way of specific example, it being understood that any input signal in which fluctuations from some reference value are to be monitored may be utilized as an input signal to the circuit of FIG. 2. Signal $\Delta A$ is applied to right control nozzle 63 of proportional fluidic amplifier 61, the latter being of substantially the same type and configuration as amplifiers 15, 39 and 49 illustrated and described in references to FIG. 1. A reference pressure signal is applied to left control nozzle 65 of amplifier 61, the reference pressure being set to quiescently deflect the power stream issuing from power nozzle 67 of amplifier 61 to the position desired in the absence of a pressure of significant amplitude applied to right control nozzle 63. For example, the reference pressure may be set so that the power stream is directed somewhat toward right output passage 69, in which case a significant quiescent pressure is provided at passage 69. Left output passage 71 of amplifier 61 then receives an output signal only in response to significant pressure fluctuations of signal A from its average value as represented by pressures in signal $\Delta A$ of sufficient magnitude to deflect the power stream toward left output passage 71. Output passages 69 and 71 of amplifier 61 are connected to respective opposed control nozzles 73 and 75 of fluidic bistable element 77. Bistable element 77 by way of example, may be of the type illustrated and described in U.S. Pat. No. 3,225,780. Right output passage 79 of bistable element 77 receives a power stream issued from power nozzle 81 upon the pressure at control left nozzle 75 exceeding the pressure at right control nozzle 73. Left output passage 83 of bistable element 77 receives the power stream upon the pressure at right control nozzle 73 exceeding the pressure at left control nozzle 75. The power stream has memory in the sense that in the absence of an opposing differential pressure applied thereacross the power stream remains deflected toward the one of output passages 79 and 83 to which it was deflected by the last applied pressure differential.

Right output passage 79 of bistable element 77 is connected to control nozzle 85 of fluidic logic invertor 87, the latter being of the type described and illustrated in U.S. Pat. No. 3,246,661. Power nozzle 89 of invertor 87 issues a power stream in response to application of pressurized fluid thereto, the power stream normally being directed toward output passage 91 in the absence of a control pressure signal at control nozzle 85. Upon application of a control pressure signal at control nozzle 85 the power stream is deflected to output passage 93. Signals provided at output passage 91 are applied to the "up" count port 99 of a fluidic slip resolver 95, for example of the type disclosed in U.S. Pat. No. 3,580,499 to P. Bauer and W. Mentzer.

A pressure controlled oscillator (PCO) 97 provides a train of fluid pulses which are applied to the "down" count input port 101 of slip resolver 95. The frequency of the pulses provided by pressure controlled oscillator (PCO) 97 is determined by the level of an adjustable reference pressure applied thereto so that the frequency of PCO 97 may be controlled accordingly. Preferably, the frequency of PCO 97 is sufficiently close to the normal expected frequency of pulses applied to "up" count port 99 to prevent an overabundance of up or down count pulses whenever the frequency of up count pulses is in its nominal or normal range. A digital count signal representing the accumulated difference between up and down counts is fed to digital-to-analog converter 103 which converts the digital signal to an analog signal having an amplitude corresponding to said accumulated count difference. The signal provided by digital-to-analog converter 103 comprises a fluid command signal which is applied to right control nozzle 105 of proportional amplifier 107 whereby to vary the gain function of said amplifier. Input signal A is applied to left control nozzle 109 of amplifier 107. It is to be understood that while the fluid command signal applied to right control nozzle 105 of amplifier 107 is applied in opposition to the input signal A, the gain command signal applied to amplifier 107 and other amplifiers discussed herein may also be connected in aiding relationship to the input signal so as to provide an increasing rather than a decreasing gain in response to increasing command signal pressures. Appropriate constant bias pressures applied to different control ports can be employed to tailor the gain function as described in U.S. Pat. No. 3,461,899 to Carmine V. DiCamillo.

In addition, the output signal from converter 103 may be a push-pull type signal (i.e. a differential pressure appearing across two lines) in which case it would be applied to respective opposing control ports of amplifier 107 in a well-known manner. An advantage of such an arrangement is that the sense or polarity as well as amplitude of the difference between up and down counts is inherently monitored.

In operation of the circuit illustrated in FIG. 2 it will be seen that each time input signal A fluctuates more than a specified amount (preselected by the setting of reference signal 65) from its average value, an output signal is provided at output passage 71 of amplifier 61. This produces a change of state in bistable element 77 so that a fluid pressure is provided at right output passage 79 thereof. This pressure is applied to the control nozzle 85 of inverter 87 whereby to deflect the power stream issued from the power nozzle 89 away from output passage 91. When the amplitude of signal A returns sufficiently close to its average value, as preselected by the setting of reference signal 65, a signal is applied to output passage 69 of amplifier 61 which in turn changes the state of bistable element 77 to remove the control pressure from control nozzle 85 of invertor 87. The power stream in inverter 87 thus returns to output passage 91 and a fluid signal is applied to up count port 99 of slip resolver 95. It is seen therefore that up count port 99 receives a count pulse for each fluctuation greater than a preselected amount of the amplitude of signal A from the average amplitude of signal A.

Of course by using either of signals $+\Delta A$ or $-\Delta A$ of FIG. 1 in place of signal $\Delta A$ at control nozzle 63, only positive or negative fluctuations may be monitored. In slip resolver 95 the frequency of up counts is referenced to time by comparing up counts to down counts and registering the net up or down count difference. The time reference is the frequency of PCO 97. The stored, continuously-monitored count difference therefore corresponds to a digitally integrated function of the up count frequency. That is, the stored net count in slip resolver 95 represents the time integral of the frequency of excessive amplitude fluctuations of the amplitude of signal A from its average amplitude. The binary signal representing the difference in up and down counts is converted to an analog signal by digital-to-analog converter 103, the amplitude of such signal being representative of the average frequency of excessive amplitude fluctuations of signal A's amplitude from the average amplitude of signal A.

Referring now to FIG. 3 of the accompanying drawings there is illustrated in schematic form a fluidic circuit for providing fluid command signals which depend upon relative variations of a predetermined parameter of two fluid input signals. More specifically, a pair of fluid input signals A and B are applied to respective fluidic differentiator elements 111 and 121 respectively. Differentiator elements 111 and 121, by way of example, may be of the type described and illustrated in U.S. Pat. No. 3,238,959. Input signal A is applied to right input port 113 of differentiator 111, port 113 being oriented such that in the absence of any further input signal to differentiator 111 signal A is directed toward and issues from left output passage 115. Input signal A is also applied to a delay element 117, which may either be passive or active in nature, through which it is passed and applied to left input port 119 of differentiator element 111. Delay element 117, by way of example, may be a fluid conduit of known length and having a determinable signal propagation delay characteristic. In the absence of any other input signal applied to element 111, a signal applied to input port 119 issues directly from right output passage 116. Delay element 117 acts to delay application of variations in signal A to left input port 119 for a predetermined period of time after application of such variations to right input port 113. When the signal applied to input ports 113 and 119 are of equal pressure, as when signal A is non-fluctuating (constant amplitude), an output signal is provided at central output port 118 of differentiator element 111. When the signals applied to input ports 113 and 119 are unequal, signals appear at passages 115 or 116 in proportion to the difference in input signal amplitude.

When the pressure of input signal A is or has been constant over a time period greater than the delay period provided by delay element 117, the pressures applied to input ports 113 and 119 of element 111 are equal and a minimal or no output signal appears at either of output passages 115 and 116. If signal A experiences an increase in pressure, this increase is first applied at right input port 113 and a resultant output signal appears at output passage 115, the amplitude of the output signal representing the difference by which the pressure at port 113 exceeds the pressure at port 119. If the sudden increase in pressure in signal A is a step function, the pressure increase is received at input port 119 at some predetermined time after it is received at input port 113, the predetermined time being determined by the propagation delay in delay element 117. Upon reception of the pressure increase in input port 119, the pressures at ports 113 and 119 again become equal and the output signal is removed from left output passage 115 and returns to central output passage 118. If the delay period of element 117 is small enough, the output signal from passage 115 is a spike, representing the derivative with respect to time of the input step function. In like manner, any increase in pressure of signal A provides an output signal at output passage 115 which is proportional to the positive rate of change of the input signal with respect to time. Hence, the signal provided at output passage 115 is designated in FIG. 3 as +dA/dt indicating that the signal at output passage 115 is a function of the first derivative with respect to time of the amplitude or pressure of signal A when such derivative is positive.

Similarly, the signal provided at right output passage 116 of element 111 is denoted −dA/dt indicating that the signal at output passage 116 is a function of the first derivative with respect to time of the pressure or amplitude of signal A when such derivative is negative. This may be readily seen when considering the effect at output passage 116 in response to pressure decreases in signal A. A pressure decrease in signal A causes a substantially immediate pressure decrease at input port 113, so that the pressure at input port 119 dominates and a resultant output signal appears at output passage 116. The signal at output passage 116 is proportional to the negative rate of change of signal A and remains until the delay period determined by element 117 expires or until the pressure decrease in signal A abates, whichever takes longer.

In a similar manner input signal B is applied directly to input port 123 and through delay element 127 to input port 129 of differentiator element 121. In the absence of pressure variation in signal B an output signal is provided at central output passage 128. When signal B experiences a pressure increase an output signal is provided at left output passage 125 and when signal B experiences a pressure decrease an output signal is provided at right output passage 126. Consequently, the output signal from output passage 125 is termed +dB/dt, and the output signal from output passage 126 is termed −dB/dt.

Signal +dA/dt is applied to control nozzle 131 of fluidic invertor element 135, which by way of example may be substantially the same as invertor 87 illustrated and described in reference to FIG. 2 above. An output signal is provided at output passage 137 of invertor 135 only in the absence of signal +dA/dt at input port 131. In like manner, −dA/dt, +dB/dt, and −dB/dt are applied to control nozzles 141, 151 and 161 of respective logic invertors 145, 155 and 165. Invertors 135, 145, 155 and 165 are preferably of the same type. The output signal from output passage 137 of invertor 135 is termed ($\overline{+dA/dt}$) representing the logical inversion of signal +dA/dt. Similarly, the output signal provided at output passage 147 of invertor 145 is designated ($\overline{-dA/dt}$), the output signal at output passage 157 of invertor 155 is designated as ($\overline{+dB/dt}$), and the output signal at output passage 167 of invertor 165 is designated as ($\overline{-dB/dt}$).

Signals ($\overline{+dA/dt}$) and ($\overline{+dB/dt}$) are applied to respective input ports 171 and 173 of fluidic NOR gate 175. NOR gate 175, by way of example, may be substantially the same as invertor 135 except that two input ports are utilized instead of the single input port required for logical inversion. The NOR output signal provided by NOR gate 175, in terms of logic representation, may be denoted ($\overline{+dA/dt}$) · ($\overline{+dB/dt}$). It will be noted that the NOR output signal thus provided at NOR output passage 179 of NOR gate 175 simply represents the AND function of the two signals +dA/dt and +dB/dt. It will be evident therefore that the signal provided at output passage 179 of NOR gate 175 could just as readily have been provided by utilizing the signals provided at output passage 115 of element 111 and output passage 125 of element 121 as inputs to a fluidic AND gate, for example of the type illustrated in U.S. Pat. No. 3,277,915. The two processes for providing the AND function are logically equivalent; however, certain advantages are achieved by utilizing the NOR gate "double inversion technique" for providing the AND function. These advantages include: relative independence of amplitude of dA/dt and dB/dt; utilization of a standard element for all logic operations, the standard element being the invertor or NOR gate employed herein; and provision of a greater fan-out ratio due to the inherent amplification provided by the NOR gate, whereas utilization of passive AND gates requires use of substantial signal amplification to operate the various utilization devices at their required input pressure levels. In a similar manner the signals $(\overline{-dA/dt})$ and $(\overline{-dB/dt})$ are applied to respective input ports 183 and 181 of fluidic NOR gate 185 to provide a NOR output signal at output passage 189 having a logic designation $(-dA/dt) \cdot (-dB/dt)$, corresponding to the AND logic function for the signals provided at output passages 116 of element 111 and 126 of element 121.

Analyzing for a moment the meaning of the signal provided at NOR output passage 179 of NOR gate 175, namely $(+dA/dt) \cdot (+dB/dt)$, it is seen that this signal is provided in response to simultaneous positive slopes occurring in signals A and B. Similarly, the signal $(-dA/dt) \cdot (-dB/dt)$ at output passage 189 of NOR gate 185 is provided when the slopes of signals A and B are simultaneously negative.

The signals provided at NOR output passages 179 and 189 of respective NOR gates 175 and 185 are applied to respective control nozzles 191 and 193 of NOR gate 195. NOR gate 195, by way of example, may be substantially the same as NOR gates 175 and 185. An output signal is provided at NOR output passage 199 of NOR gate 195 only when neither signal $(+dA/dt) \cdot (+dB/dt)$ nor signal $(-dA/dt) \cdot (-dB/dt)$ are generated. In other words, the signal at output passage 199 of NOR gate 195 is provided whenever the slopes of input signals A and B are either of different polarity or when the slope of at least one signal is zero.

NOR gate 195 also has an OR output passage 197 which provides an output signal in response to the presence of an input signal at either of its input ports. The OR output passage 197 of NOR gate 195 provides a signal whenever either of signals $(+dA/dt) \cdot (+dB/dt)$ or $(-dA/dt) \cdot (-dB/dt)$ are provided; therefore, a signal is provided at OR output passage 197 whenever the slopes (or first derivatives) of input signals A and B are of the same polarity. The output signals at NOR output passage 199 and OR output passage 197 of gate 195 may be utilized as a fluid command signal for the purpose of changing the output versus the input characteristic of a fluidic element or circuit in accordance with the principles of the present invention.

The signal provided at NOR output passage 199 of gate 195 is applied to a storage capacitor 201 of sufficient capacity to integrate the pressure signal applied thereto. Similarly, the signal provided at OR output passage 197 is applied to fluidic capacitor 203 which similarly serves to integrate its input signal. The output signal provided from capacitor 201 represents a function of the duty cycle or average frequency of occurrence of the situation wherein the slopes of input signals A and B are either different or simultaneously zero. Similarly, the output signal from capacitor 203 is a function of the duty cycle or average frequency of occurrence of the situation wherein the slopes or first derivatives of signals A and B are of the same polarity. The output signal from either capacitor may be used as a fluid command signal. For example, the output signals from both capacitors 201 and 203 are applied to opposed control nozzles 205 and 207 respectively of proportional fluidic amplifier 209. Input signals A and B are also applied to a pair of opposed control nozzles 211 and 213 of amplifier 209. Amplifier 209, by way of example may be of substantially the same configuration as amplifier 15 of FIG. 1. Amplifier 209 and the connections thereto are shown by way of example for the purpose of illustrating how the output signals from capacitors 201 and 203 serve as fluid command signals in accordance with the principles of the present invention. It is to be understood of course that only one of these command signals need be applied in any situation and that any of the other command signals discussed here and before, such as the output signal from either of output passages 199 or 197 of gate 195 or the output signals from either of output passages 115 or 116 of element 111 or output passages 125 or 126 of element 121 may be similarly employed as fluid command signals in accordance with the principles of the present invention. Further amplifier 209 is intended to be representative of any element or circuit which has an output signal versus input signal characteristic (that is selectively variable).

Referring now specifically to FIG. 4 of the accompanying drawings there is illustrated in schematic form another circuit whereby digital fluid command signals may be generated in accordance with the comparison of like parameters of two fluid input signals. More specifically input signal A is applied to an input port 223 of differentiator element 225, the latter by way of example, being substantially the same as differentiator elements 111 and 121 of FIG. 3. Signal A is also applied to input port 221 via a delay element 227 so that application of variations in amplitude of signal A to input port 221 is delayed for some predetermined time period after application of the same variations to input port 223. As was the case with element 111 of FIG. 3, the signal +dA/dt is provided at output passage 229 of element 225 and the signal −dA/dt is provided at output passage 231 of element 225.

Similarly, input signal B is applied to input port 233 of a differentiator element 235, the latter by way of example, being substantially the same as element 225 described above. Input signal B is also applied indirectly to input port 237 of element 235 via a delay element 239 so that variations in amplitude of signal B appear at input port 237 at some predetermined time period after these same variations appear at input port 233. As was the case with delay elements 117 and 127 in FIG. 3, delay elements 227 and 239, for purposes of the present description, effect equal delay periods for signals applied thereto. As described with respect to element 121 of FIG. 3, output passage 241 of differentiator element 235 provides the signal −dB/dt, and output passage 243 provides the signal +dB/dt.

Input signals A and B are also applied to opposed control nozzles 245 and 247 of fluidic binary element 249. Element 249 by way of example, may be substantially the same as element 77 illustrated and described above with respect to FIG. 2. Element 249 in FIG. 4 serves as a signal amplitude comparator in that the power stream issuing from power nozzle 251 is deflected toward either of two output passages 253 and 255 in accordance with the relative signal amplitudes between signals A and B. More specifically, if signal A, applied to left control nozzle 245, has a greater amplitude than signal B applied to right control nozzle 247, the power stream is deflected toward right output passage 255. Similarly, if the amplitude of signal B is greater than that of signal A the power stream is deflected toward left output passage 253. Thus the signal provided at output passage 253 is termed B>A an the output signal provided at output passage 255 is designated A>B. When signals A and B are of equal amplitude, the power stream remains directed to the output passage to which it was last deflected.

The signals −dA/dt and −dB/dt are applied to opposite control nozzles 257 and 259 respectively of fluidic binary element 261, the latter, by way of example being of the same general configuration as binary element 249. In a manner analogous to that described with reference to element 249, whenever signal −dA/dt, applied to left control nozzle 257, has an amplitude which is greater than that of signal −dB/dt applied to right control nozzle 259, a signal designated as −dA/dt>dB/dt is provided at right output passage 265. Similarly, whenever the amplitude of signal −dB/dt is greater than that of −dA/dt, a signal designated as −dB/dt>−dA/dt is provided at left output passage 263 of element 261.

Signal +dA/dt is applied to left control nozzle 267 and signal +dB/dt is applied to right control nozzle 269 of fluidic binary element 271. Element 271 by way of example, is substantially the same in configuration and operation as element 261 and 249. Thus, the right output passage 273 of element 271 provides a signal designated as +dA/dt> +dB/dt and left output passage 275 of element 271 provides a signal designated as +dB/dt> +dA/dt.

It is clear that many fluidic circuits or amplifier elements may usefully have their output versus input signal characteristics varied in response to any of the signals B>A, A>B, −dB/dt>−dA/dt, −dA/dt>−dB/dt, +dB/dt>dB/dt and +dA/dt>+dB/dt provided in the fluidic circuit illustrated in FIG. 4.

Referring now specifically to FIG. 5 of the accompanying drawings there is illustrated a fluidic logic circuit, in schematic form, which utilizes the fluid command signals generated in the circuit of FIG. 4 to provide digital indications representing the conditions whereby signals A and B have amplitudes which are diverging or converging. More specifically, the signals +dB/dt>dA/dt and −dA/dt>−dB/dt are applied as two input signals to a fluidic OR gate 281. OR gate 281, by way of example, may be substantially the same as fluidic NOR gate 195 of FIG. 3, in which the OR output passage is utilized providing a fluidic output signal in response to the presence of either of two input signals at the input ports of the gate. Similarly, the input signals −dB/dt>−dA/dt and +dA/dt>+dB/dt are applied as input signals to a fluidic OR gate 283 which is of substantially the same configuration as gate 281.

Examining the input signals to OR gate 281 for a moment, it is seen that OR gate 281 provides an output signal whenever signal B has a positive slope which is more positive than the slope of signal A, or, whenever signal A has a negative slope which is more negative than the slope of signal B. Under either of these sets of conditions, it is clear that if signal A has a greater amplitude than signal B, signals A and B must be converging. Therefore, the output signal from OR gate 281 is applied as an input signal to fluidic AND gate 285 to which a further input signal A>B is also applied. The output signal from AND gate 285 is provided only when both input signals are present and therefore represents a situation whereby signals A and B have convergent amplitudes. Similarly, the conditions which provide either input signal to OR gate 281 are indicative of diverging amplitudes for signals A and B whenever signal B has a greater amplitude than signal A. The output signal from OR gate 281 is applied to a further fluidic AND gate 287 as an input signal thereto along with the input signal B>A. The output signal from AND gate 287 indicates that signals A and B have diverging amplitudes.

Examining now the conditions under which input signals are provided to fluidic OR gate 283, it is seen that OR gate 283 provides an output signal whenever signal A has a positive slope which is more positive than the slope of signal B, or signal B has a negative slope which is more negative than the slope of signal A. Analysis of these conditions indicates that whenever OR gate 283 provides an output signal, signals A and B must have converging amplitudes if signal B has a greater amplitude than signal A, and that signals A and B must have diverging amplitudes if the amplitude of signal A is greater than the amplitude of signal B. Therefore the output signal from OR gate 283 is applied as an input signal to fluidic AND gate 289 along with a further input signal B>A, the output signal from AND gate 289 corresponding to a condition whereby signals A and B have converging amplitudes. In like manner the output signal from OR gate 283 is applied as an input signal to fluidic AND gate 291 along with the further input signal A>B. The output signal from AND gate 291 is indicative of the fact that the amplitudes of signals A and B are diverging.

The AND gates 285, 287, 289 and 291 may either be fluidic AND gates such as those disclosed in U.S. Pat. No. 3,277,915 or may be a combination of fluidic invertors and NOR gates utilized to provide the AND logic function as described in reference to FIG. 3.

The output signals from AND gates 285 and 289, both of which represent the situation where signals A and B have converging amplitudes, are applied as input signals to fluidic OR gate 293, the output from which indicates that signals A and B have converging amplitudes. The output signals from AND gates 287 and 291, both of which represent conditions whereby signals A and B have diverging amplitudes, are applied as input signals to fluidic OR gate 295. The output signal from fluidic OR gate 295 indicates that the amplitudes of signals A and B are diverging.

The logic circuitry in FIGS. 4 and 5 is operative also when either of signal A and B is substantially zero. By way of example, assume signal A is zero and signal B is going increasingly negative. The only active input signals applied to the circuit of FIG. 5 under these circumstances are (−dB/dt>−dA/dt) and A>B. Consequently AND gate 291 is enabled to in turn enable OR gate 295 to provide an indication that A and B are diverging which, in fact, is the case. Similar logic operation ensues for various other assumed conditions.

The output signals from OR gates 293 and 295 may be utilized in accordance with the principles of the present invention as gain command signals for fluidic amplifiers or fluidic circuits having variable output signal versus input signal characteristics. In the alternative, the signals "A & B DIVERGING" and "A & B CONVERGING" provided by OR gates 295 and 293 respectively, may be utilized as gating signals which selectively permit application of an analog fluid signal rather than a digital fluid signal to an amplifier or fluidic circuit having a variable output versus input signal characteristic. An example of the latter utilization of these signals is illustrated in FIG. 6 of the accompanying drawings.

Figure 6:
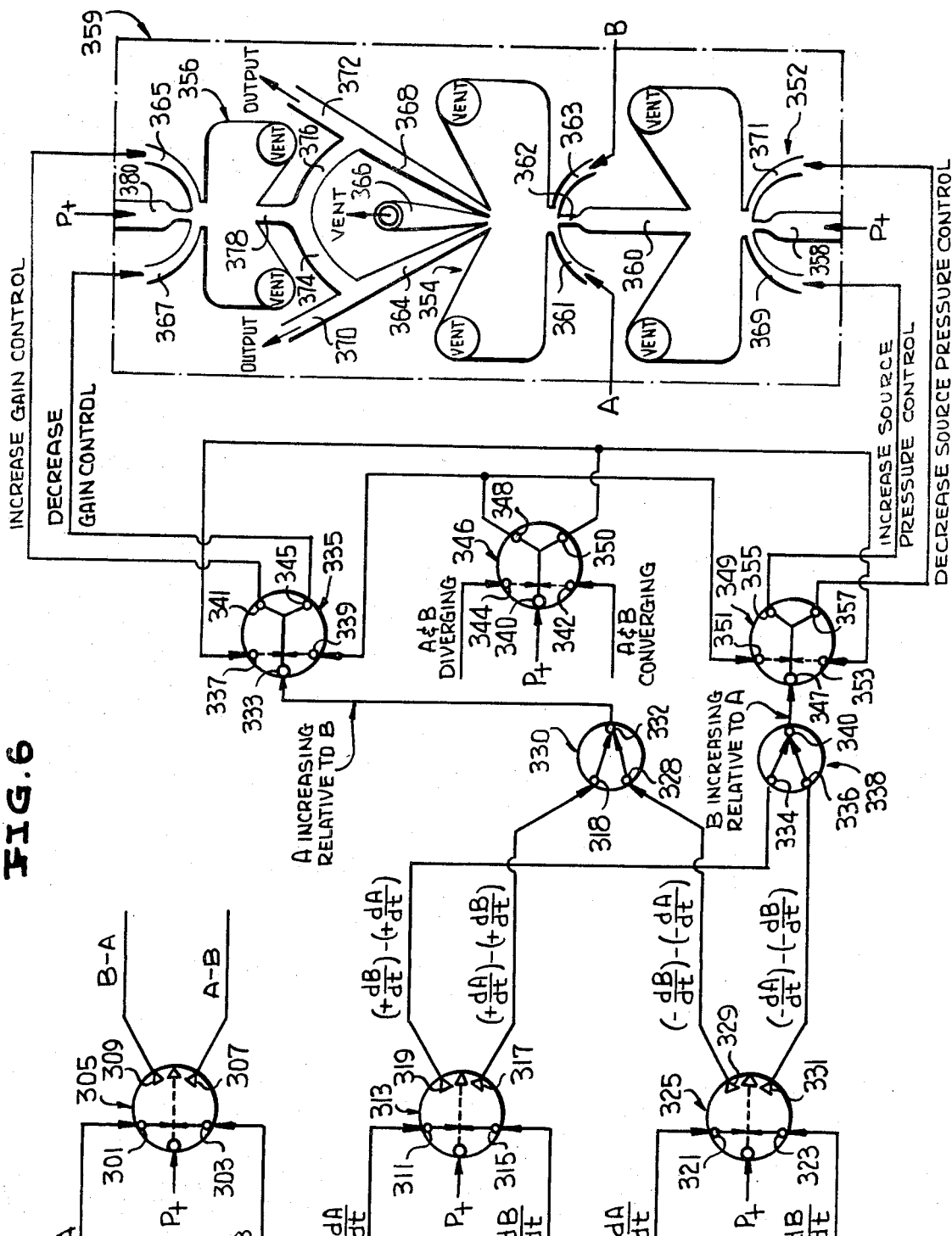
FIG. 6 is a schematic diagram of a fluidic circuit in which the gain of a fluidic amplifier is selectively varied in response to convergence and divergence of the amplitudes of two input signals to the amplifier.

Referring now more specifically to FIG. 6 there is illustrated a schematic diagram of a fluidic circuit in which the output signals provided in the circuit of FIG. 5 are utilized to gate analog signals so that the latter may be selectively applied to vary the gain of a fluidic proportional amplifier. More specifically, input signals A and B are applied to opposed control nozzles 301 and 303 of proportional fluidic amplifier 305. Amplifier 305, by way of example, may be of substantially the same type and configuration as amplifier 15 in FIG. 1. The signal provided at right output passages 307 and 309 of amplifier 305 have amplitudes which are proportional to the amplitude difference between signal A applied to left control nozzle 301 and signal B applied to right control nozzle 303. When signal A is greater than signal B, the analog output signal at passage 307 is greater than the analog signal at passage 309. Hence, the signal at output passage 307 is designated as A–B. In like manner the signal provided at left output passage 309 of amplifier 305 is designated as B–A, and has an amplitude which exceeds the amplitude at output passage 307 by an amount which is proportional to the amount by which the amplitude of signal B exceeds that of signal A. Signals B–A or A–B may be utilized separately or cooperatively (i.e. push-pull) as fluid command signals for the purpose of varying the output signal versus input signal characteristics of a fluidic circuit or element in accordance with the principles of the present invention. Further, the signals B–A and A–B may be selectively gated in their application to the element or circuit to be controlled by means of signals "A & B DIVERGING" and "A & B CONVERGING" generated in accordance with the principles described above with reference to FIG. 5. To facilitate description of the present invention and to reduce the complexity of the appearance of the drawings, illustration of such utilization is omitted since the use of "A & B DIVERGING" and "A & B CONVERGING" as gating signals for two other signals is illustrated in FIG. 6. It is to be understood of course that the particular signal to be gated by the signals "A & B DIVERGING" and "A & B CONVERGING" is a matter of choice dependent upon the particular application employed in a system.

The signal +dA/dt generated as illustrated in FIG. 4 is applied as a control signal to left control nozzle 311 of proportional fluidic amplifier 313. By way of example, amplifier 313 is of substantially the same configuration as amplifier 305. The signal +dB/dt, also generated in the circuit of FIG. 4, is applied to right control nozzle 315 of amplifier 313. In accordance with the same theory of operation described above for amplifier 305, left output passage 319 of amplifier 313 provides a signal designated (+dB/dt) − (+dA/dt), indicating that this signal has an amplitude which varies in proportion to the amount by which the amplitude of signal +dB/dt exceeds the amplitude of signal +dA/dt. Right output passage 317 of amplifier 313 provides a signal designated as (+dA/dt) − (+dB/dt), indicating that this signal has an amplitude which is proportional to the amount by which signal +dA/dt exceeds the amplitude of signal +dB/dt.

The signal −dA/dt is applied to left control nozzle 321 of fluidic amplifier 325 and signal −dB/dt is applied to right control nozzle 323 of amplifier 325. Amplifier 325 is a proportional fluidic amplifier which by way of example is of the same general configuration as amplifiers 313 and 305 described above. In accordance with the same theory of operation described above relative to amplifiers 305 and 313, left output passage 329 provides a signal designated (−dB/dt) − (−dA/dt), indicating that this signal has an amplitude which is proportional to the amount by which the amplitude of signal −dB/dt exceeds the amplitude of signal −dA/dt. Similarly, right output passage 331 of amplifier 325 provides an output signal designated as (−dA/dt) − (−dB/dt), indicating this signal has an amplitude which varies as a function of the amount by which the amplitude of signal −dA/dt exceeds that of signal −dB/dt.

Right output passage 317 of amplifier 313 and left output passage 329 of amplifier 325 are connected to left and right inlet ports 318 and 328 respectively of maximum pressure selector unit 330, which is of the same type as unit 31 in FIG. 1. Output passage 332 of unit 330 provides a signal "A INCREASING RELATIVE TO B", the amplitude of which is proportional to the rate with respect to time at which the amplitude of signal A is increasing in a positive sense relative to the rate of positive amplitude increase of signal B. Maximum pressure selector unit 330 is required to assure that the higher of the two pressures at passages 317 and 329 provides the "A INCREASING RELATIVE TO B" signal. Similarly, left output passage 319 of amplifier 313 and right output passage 331 of amplifier 325 are connected to left and right inlet ports 334 and 336 respectively of maximum pressure selector 338, which is of the same type as unit 31 in FIG. 1. Output passage 340 of unit 338 provides a signal "B INCREASING RELATIVE TO A," the amplitude of which is proportional to the rate with respect to time at which the amplitude of signal B is increasing in a positive sense relative to the rate of positive amplitude increase of signal A.

Signals "A & B CONVERGING" and "A & B DIVERGING," received from respective OR gates 293 and 295 of FIG. 5, are applied to respective right and left control nozzles 342 and 344 of fluidic bistable element 346, the latter having a power nozzle 340. Element 346 serves the function of a buffer amplifier, isolating OR gates 295 and 293 from bistable elements 349 and 335 to be described below. For reasons to be discussed in greater detail subsequently, it is important that signals "A & B CONVERGING" and "A & B DIVERGING" never be present simultaneously. Since OR gates 295 and 293 do not necessarily have precisely identical switching characteristics, it is possible for both gates to provide signals for a short time interval after one has switched and the other has not. Since element 346 can apply only one signal at a time, the simultaneous presence of both signals is avoided.

Signal "A INCREASING RELATIVE TO B" is applied to the power nozzle 333 of fluidic bistable element 335, the latter by way of example, being substantially the same as element 77 described and illustrated in relation to FIG. 2. The left control nozzle 337 of bistable element 335 receives the amplified version of signal "A & B DIVERGING" from output passage 350 of element 346. Right control nozzle 339 of element 335 receives the amplified version of signal "A & B CONVERGING," from output passage 348 of element 346. In accordance with the well known theory of operation of fluidic bistable elements of the type of which element 335 is comprised, whenever signals A and B are diverging the analog signal "A INCREASING RELATIVE TO B" applied to power nozzle 333 is deflected to right output passage 345 of element 335, the signal being deflected to left output passage 341 whenever signals A and B are converging as manifested by the application of signal "A & B CONVERGING" to control nozzle 339. When signals A and B are neither converging nor diverging the signal "A INCREASING RELATIVE TO B" is equal in amplitude to signal "B INCREASING RELATIVE TO A." It is for this reason that digital gating signals "A & B DIVERGING" and "A & B CONVERGING" are applied to buffer amplifier 346 before being applied to gating elements 335 and 349. If such were not the case, the simultaneous presence of these gating signals could occur and render switching of elements 335 and 349 unreliable.

The signal "B INCREASING RELATIVE TO A" is applied to power nozzle 347 of bistable fluidic gating element 349, the latter by way of example being of substantially the same type and configuration as gating element 335 described above. The signal "A & B CONVERGING" is applied to left control nozzle 351 of gating element 349 and the signal "A & B DIVERGING" is applied to right control nozzle 353 of gating element 349. Left output passage 355 receives the analog signal "B INCREASING RELATIVE TO A" whenever signal A and B are diverging; right output passage 357 receives the analog signal "B INCREASING RELATIVE TO A" whenever signals A and B are converging. When the amplitudes of signals A and B are neither converging or diverging, signals "B INCREASING RELATIVE TO A" and "A INCREASING RELATIVE TO B" are equal in amplitude.

Also illustrated in FIG. 6 is a fluidic amplifier 359 circuit having an output signal versus input signal characteristic to be controlled in response to a fluid command signal in accordance with the principles of the present invention. Amplifier circuit 359 includes three stream-interaction proportional fluidic amplifiers 352, 354, and 356. Amplifier 352 includes a power nozzle 358 which receives pressurized fluid (P+) and issues a power stream which is selectively deflectable by control streams issued from opposed left and right control nozzles 369 and 371 respectively. Outlet passage 360 has an ingress orifice disposed downstream and right-of-center of power nozzle 358. In this position, outlet passage 360 receives more of the power stream issued from nozzle 358 whenever a control stream issued by left control nozzle 369 deflects the power stream to the right. Likewise, less of the power stream is received by passage 360 when power stream deflection is to the left, as is the case when control nozzle 371 issues a dominating control stream. Left control nozzle 369 receives from left outlet passage 355 of gating element 349 a signal designated as "INCREASE SOURCE PRESSURE CONTROL." Right control nozzle 371 of amplifier 352 receives a "DECREASE SOURCE PRESSURE CONTROL" signal from right outlet passage 357 of element 349. The reason for this nomenclature will become apparent from the detailed operational description presented hereinbelow.

The downstream end of outlet passage 360 terminates in a flow restriction or nozzle 362 which serves as a power nozzle for amplifier 354. The latter has left and right control ports 361 and 363 respectively which receive signals A and B, respectively, and issue opposed control streams to deflect the power stream issued from power nozzle 362. Downstream of the control nozzles and disposed in receiving relationship to the power stream issued by power nozzle 362 are left, central and right outlet passages 364, 366 and 368 respectively. Central outlet passage 366 serves as a vent, while left and right outlet passage 364 and 368 provide the output signal for circuit 359. Each of the latter passages bifurcates into an output section (370 for passage 364; 372 for passage 368) and a throttle section (374 for passage 364; 376 for passage 368). Throttle sections 374 and 376 are joined and communicate in common with a further passage 378.

Amplifier 356 includes a power nozzle 380, opposed control nozzles 365 and 367, and an outlet passage which is, in fact, passage 378. Outlet passage 378 is off-center with respect to power nozzle 380 such that more power stream is received at passage 378 when a control stream is issued from control nozzle 365 than when a control stream is issued from control nozzle 367. The fluid received by outlet passage 378 serves to pressurize throttle sections 374 and 376 in amplifier 354. Control nozzle 365 receives an "INCREASE GAIN CONTROL" signal from left outlet passage 341 of gating element 335. Control nozzle 367 receives a "DECREASE GAIN CONTROL" signal from right outlet passage 345 of gating element 335.

The operation of circuit 359 in response to input signals A and B and four control signals "A increasing relative to B," "B INCREASING RELATIVE TO A," "A & B DIVERGING" and "A & B CONVERGING," is as follows: A differential output pressure appears across output sections 370 and 372 of output passages 364 and 368 primarily as a function of the difference in amplitude between input signals A and B. In many cases it is desirable to limit the gain of an amplifier or to change its supply pressure to prevent saturation at the amplifier output when the input signal is at a high level, as for example when the amplitude difference between signals A and B is large. Similarly, it is often desired to increase the gain of an amplifier and decrease saturation level so as to reduce noise in many cases where low level input signals are present. The function of the various gain command signals applied to amplifier 359 is to increase the amplifier gain and decrease the average supply pressure in amounts dependent upon rate of convergence when the signals A and B are converging, and to decrease the gain amplifier and increase the supply pressure in accordance with rate of divergence when the signals A and B are diverging. Thus, if the amplitudes of signals A and B are diverging and signal A has an amplitude which is increasing in a positive sense relative to the amplitude of B, the "DECREASE GAIN CONTROL" signal, proportional to the rate of increase with respect to time of the amplitude of signal A relative to the amplitude of signal B, is applied to control nozzle 367 of amplifier 356. The effect of this command signal is to decrease the fluid received by passage 378 and thereby reduce the pressure in throttle sections 374 and 376 in amplifier 354. This permits more signal is passage 364 and 368 to bleed through their respective throttle sections and passage 378 into the vented region of amplifier 356. This lowers the pressure at sections 370 and 372 and hence reduces the gain of amplifier 354. Similarly if signal A is increasing relative to signal B and the signals are converging, the "INCREASE GAIN CONTROL" signal, proportional to the rate of increase of signal A relative to that of signal B, is applied to control nozzle 365 of amplifier 356. The effect of the command signal in this case is to provide more fluid at passage 378, increase the pressure in throttle section 374 and 376, increase the output signal in output sections 370, 372, and hence increase the gain of the circuit.

A similar analysis is appropriate for the output signals from binary element 349 as applied to the control nozzles 369 and 371 of amplifier 352. In particular, the "INCREASE SOURCE PRESSURE CONTROL" signal is applied to left control nozzle 369 whenever signals A and B are diverging, and the "DECREASE SOURCE PRESSURE CONTROL" signal is applied to right control nozzle 371 of amplifier 352 whenever signals A and B are converging, assuming of course that the "B INCREASING RELATIVE TO A" signal is applied to gating element 349. When left control nozzle 369 receives a signal, passage 360 receives more fluid and the power stream pressure increases in amplifier 354. This extends the saturation range for amplifier 354, rendering the latter less subject to distortion in response to large amplitude differences between signals A and B. When right control nozzle 371 receives a signal, passage 360 receives less fluid and the power stream pressure in amplifier 354 decreases. This is desirable where the amplitude difference between signals A and B is so small as to render the signal to noise ratio very small. In other words, reducing the power stream pressure brings about a significant improvement in signal to noise ratio for amplifier 354.

Referring now specifically to FIG. 7 of the accompanying drawings there is illustrated in schematic form a fluidic circuit for providing a fluid command signal for utilization in accordance with the principles of the present invention wherein the fluid command signal is proportional to the difference in frequency of plural input signals. More particularly, an input signal W is applied to control nozzle 381 of a fluidic OR gate 383. OR gate 383 by way of example, is of substantially the same configuration as element 195 in FIG. 3. A second input signal X is applied to control nozzle 385 of OR gate 383. An output signal is provided at OR output passage 387 of OR gate 383 whenever either input signal W or X is present at one or both of nozzles 381 and 385. In a similar manner input signals Y and Z are applied to control nozzles 389 and 391 respectively of a fluidic OR gate 393, the latter being substantially the same as OR gate 383. An OR output signal is provided at OR output passage 395 in response to the presence of either of signals Y or Z at control nozzles 389 or 391 respectively. The OR output signals from OR output passage 387 and 395 are applied to respective counters 397 and 399 which keep continuous or running counts of the frequencies at which respective OR output signals are provided. The difference between the counts of counters 397 and 399 is continuously monitored by digital comparator 401 and the count difference is converted to an analog signal having an amplitude proportional to the count difference between counters 397 and 399 by digital-to-analog converter 403. Counters 397, 399, comparator 401 and digital-to-analog converter 403 may be of substantially the same type as the corresponding elements disclosed in co-pending U.S. Pat. No. 3,495,776 to W. C. O'Neill.

In operation it is evident that the circuit of FIG. 7 serves to provide an analog output signal which has an amplitude proportional to the difference between the sum of the frequencies of signals W and X and the sum of the signal Y and Z. W and X may be input signals to the amplifier or circuit which is being controlled by the fluid command signal provided at the output of digital-to-analog converter 403 or the signals may be derivatives of various input signals to such element or circuit. In fact any of the input signal parameters for which command signals have been generated in the previously described embodiments of the present invention may be utilized for the signals W, X, Y and Z in the circuit of FIG. 7. It is of course to be understood that provision of four input signals to the circuit of FIG. 7 is intended to be illustrative only in that two, three, four, five or any number of input signals may be compared in the same manner to provide a command signal which is analog in nature and has an amplitude which varies in proportion to the difference between frequencies or combinations of the sums of frequencies of the various input signals.

Referring now in particular to FIG. 8 of the accompanying drawings there is illustrated in schematic form a fluidic circuit for generating further fluid command signals in accordance with the provisions of the present invention. In particular there is provided a proportional fluidic amplifier 411 having a left control nozzle 413 to which an input signal S is applied. Amplifier 411 is of substantially the same configuration as amplifier 15 of FIG. 1. Right control nozzle 415 of amplifier 411 receives a bias pressure signal which acts to position the power stream of amplifier 411 as desired in the absence of input signal S to control nozzle 413. The output passage of interest in amplifier 411 is central output passage 417, which under quiescent conditions (that is where input signal S is at its quiescent level or level from which variations are to be monitored), has the power stream centrally aligned therewith. The output signal at central output passage 417 may be denoted as K–S indicating that the signal has an amplitude K when signal S is at its zero or reference amplitude, and that the signal decreases from this amplitude in direct proportion to variations in signal S. Signal (K–S) is differentiated in differentiator element 419, the latter being substantially identical to differentiator elements 111 and 121 of FIG. 3. More specifically, the signal K–S is applied directly to input port 421 of differentiator element 419 and is applied to input port 423 of differentiator element 419 via delay element 418. Variations in signal K–S are manifested at input port 423 at a predetermined time after they are manifested at input port 421, the predetermined time being determined by delay element 418. In accordance with the same convention utilized in conjunction with FIG. 3, the signal provided at left output passage 425 of differentiator element 419 is denoted as +d(K–S)/dt and the signal at output passage 427 of element 419 is denoted as –d(K–S)/dt. The output signal from central output passage 429 of element 419 is denoted by the following expression: (K–S) – d(K–S)/dt , indicating that the signal at passage 429 is at a maximum value, approximately equal to K–S, when K–S is a steady non-varying signal, and decreases in accordance with the rate of change of increase or decrease of signal K–S.

Any of the signals provided at left output passage 425, right output passage 427 and central output passage 429 of element 419 may be utilized as fluid command signals in accordance with the principles of the present invention. By way of example, output signal –d(K–S)/dt from output passage 427 is illustrated as being applied to a proportional fluidic amplifier 435 at right control nozzle 431 and in opposition to input signal S applied to left control nozzle 433 of amplifier 435. In this manner, and as discussed here and above in reference to various other gain control signals, signal –d(K–S)/dt acts to vary the symmetry and dynamic characteristics of the gain of amplifier 435 as a function of the existence of and amplitude of a negative rate of change of signal S.

Figure 9:
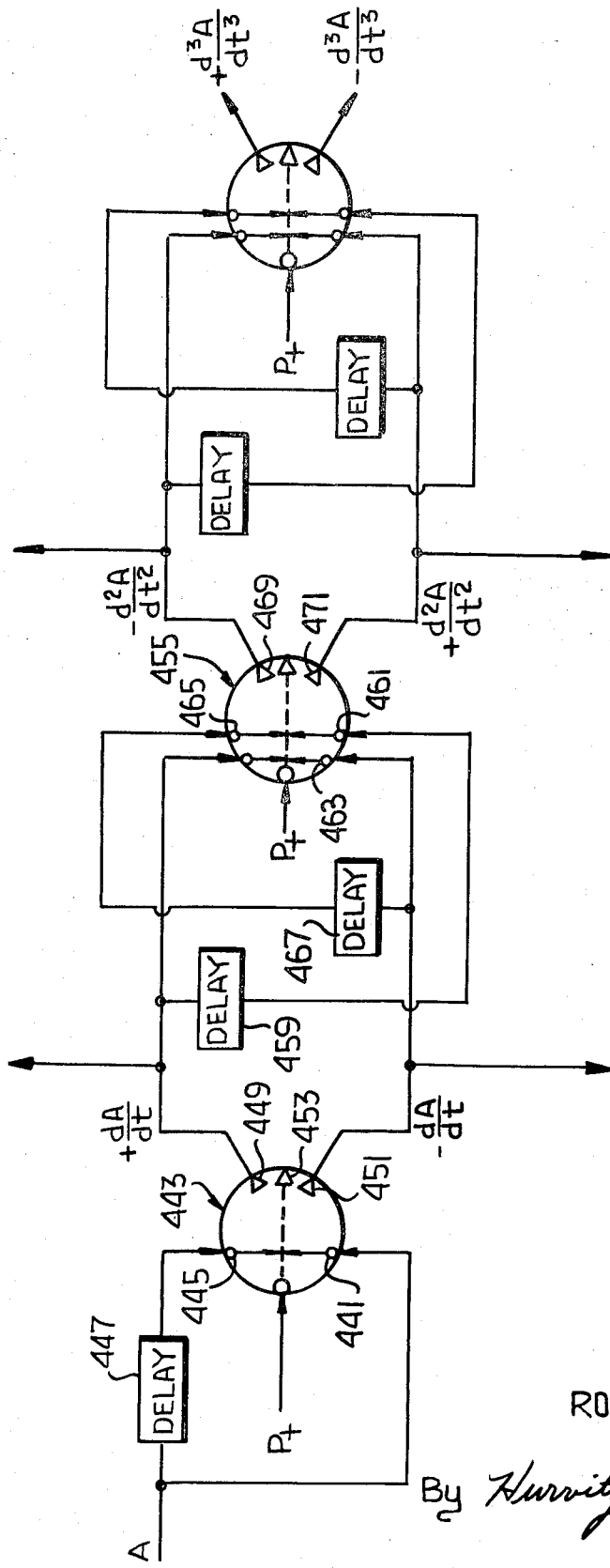
FIG. 9 is a schematic diagram of a fluidic circuit for providing fluid command signals as a function of any order time derivative of a fluid inputs signal.

Referring now specifically to FIG. 9 of the accompanying drawings there is illustrated in schematic form a fluidic circuit wherein fluid command signals proportional to the time derivatives of an input signal are generated. More specifically, input signal A is applied directly to right control nozzle 441 of proportional fluidic amplifier 443, the the latter being substantially the same type as amplifier 15 of FIG. 1. Signal A is also provided at left control nozzle 445 of amplifier 443 via a delay element 447. The power stream of amplifier 443 is directed toward left output passage 449 in response to increases of amplitude for signal A and toward right output passage 451 in response to decreases of amplitude in signal A. For steady state values in signal A the power stream is directed toward a central output passage 453. Thus, in a manner analogous to the operation of element 15 of FIG. 1, the signal +dA/dt is provided at output passage 449 and the signal –dA/dt is provided at output passage 451. It is seen therefore that the differential pressure appearing across output passages 449 and 451 represents the first derivative with respect to time of the amplitude of signal A. This signal may be employed as desired as a fluid command signal in accordance with the principles of the present invention.

The differential signal provided at output passages 449 and 451 of amplifier 443 is differentiated at a second proportional fluidic amplifier 455. More particularly signal +dA/dt is applied directly to left control nozzle 457 of amplifier 455, and is also applied via delay element 459 to right control nozzle 461 of amplifier 455. Similarly, signal –dA/dt is applied directly to left control nozzle 463 of amplifier 455 and via delay element 467 to left control nozzle 465 of amplifier 455. Due to the differentiation action provided at amplifier 455 by the delay elements 459 and 467, left output passage 469 provides a signal $-d^2A/dt^2$ and right output passage 471 provides a signal $+d^2A/dt^2$. In a similar manner the second derivative provided as a differential pressure across the output passage 469 and 471 of amplifier 455 may be further differentiated in an identical manner to provide an output signal as a differential pressure which varies in proportion to the third derivative with respect to time of input signal A. This is illustrated in FIG. 9 by means of a third amplifier stage. In this manner a derivative with respect to time of any desired order can be provided and utilized in a fluid command signal within the scope of the present invention.

It is to be understood that the numerous fluid command signals generated in accordance with the principles described herein above may be used either singly or in combination to control output signal versus input signal characteristics of fluidic elements and circuits. The combination of the various command signals may be either simultaneous or selective in accordance with switching considerations. As an example of combining the various fluid command signals, a given fluid amplifier element may receive command signals corresponding to the average amplitude of the input signal, to the average fluctuation of the amplitude of the input signal, the average frequency of the input signal, to the phase relationship of the input signal relative to the other input signal, and to a time derivative of the input signal. This combination of course is simply by way of example and it will be clear to those of ordinary skill in the art that any desired combination of command signal may be utilized to achieve variable output versus input signal characteristics in fluidic elements and circuits.

While I have described and illustrated specific embodiments of my invention, it will be clear that variations of the details of construction which are specifically illustrated and described may be restored to without departing from the true spirit and scope of the invention as defined in the appended claims.

I claim:

1. In a fluidic amplifier circuit having an analog fluidic amplifier which provides a fluid output signal as a function of a fluid input signal and responsive to a fluid command signal for varying said function;
   means responsive to said fluid input signal for providing as said command signal a fluid signal having an amplitude which varies as a function of the amplitude of fluctuation of said input signal from the average amplitude of said input signal; and
   means for applying said fluid command signal to said analog fluidic amplifier to vary said function as a function of the amplitude of fluctuation of said input signal from the average amplitude of said input signal;
   wherein said function by which said fluid command signal varies in a substantially linear proportional function of the amplitude of fluctuations of said input signal from its average amplitude; and wherein said means for providing a fluid signal as said fluid command signal comprises:

proportional fluidic amplifier means having first and second input ports for receiving respective first and second fluid signals and an output port for providing said fluid signal as said fluid command signal having an amplitude which achieves maximum value when the fluid signals received by said first and second input ports are of equal amplitude and which decreases proportionally with increasing magnitude of the amplitude difference between the signals received by said first and second input ports;

signal storage means responsive to said fluid input signal providing a first fluid signal having an amplitude corresponding to the average amplitude of said fluid input signals; and means for applying said fluid input signal to said first input port and said first fluid signal to said second input port;

whereby said fluid command signal has an amplitude which is maximum when the amplitude of said input signal is equal to the average amplitude of said input signal and which decreases in accordance with fluctuations of the amplitude of said input signal above and below the average amplitude of said input signal.

2. A fluidic amplifier circuit having an analog amplifier for providing a fluid input signal as a function of at least one of a plurality of fluid input signals and responsive to a fluid command signal for varying said function, said plurality of fluid input signals each having a predetermined parameter, the predetermined parameter being independently variable for each fluid input signal, said circuit comprising:

control means responsive to at least two of said input signals for comparing their predetermined parameters and for providing a fluid control signal having an amplitude which varies as a function of the difference between the predetermined parameters of said at least two of said fluid input signals;

means for applying said fluid control signal to said proportional fluidic amplifier as said fluid command signal;

wherein said control means includes means for deriving a first derivative signal for each of said two input signals, each first derivative signal having an amplitude proportional to the first derivative with respect to time of the amplitude of the corresponding input signal; and wherein said predetermined parameter is the first derivative with respect to time of the amplitude of each of said fluid input signals.

3. The combination according to claim 2 wherein said control means comprises:

first and second fluidic comparator means, each having first and second input ports for receiving respective fluid signals and at least one output port for providing a first output signal only when and in proportion to the amount by which the amplitude of the fluid signal received by said first input port exceeds the amplitude of the fluid received by said second input port;

means for applying a first of said at least two fluid input signals to said first input port of said first fluid comparator means;

delay means for applying said first fluid input signal to said second input port of said first fluidic comparator means upon expiration of a predetermined period of time after application of said first input signal to said first input port of said first fluidic comparator means;

means for applying the second of said at least two fluid input signals to said first input port of said second fluidic comparator means;

delay means for applying said second fluid input signal to said second input port of said second fluidic comparator means upon expiration of a predetermined period of time after application of said second input signal to said first input port of said second fluidic comparator means;

further fluidic comparator means responsive to said output signals from said first and second fluidic comparator means for providing said fluid command signal having an amplitude which varies in response to the difference in amplitude between said output signals from said first and second fluidic comparator means.

4. The combination according to claim 2 wherein said control means comprises:

fluidic logic means responsive to said at least two fluid input signals for providing a first fluid logic signal whenever the amplitudes of said at least two fluid input signals are converging and for providing a second fluid logic signal whenever the amplitudes of said at least two fluid input signals are diverging;

comparator means responsive to said at least two fluid input signals for providing an analog fluid signal having an amplitude which is proportional to the difference between the first derivatives with respect to time of the amplitude of said at least two fluid input signals;

means for applying said analog fluid signal to said analog fluidic amplifier as said fluid command signal, said last mentioned means comprising switching means responsive to said first fluid logic signal for applying said analog fluid signal to said amplifier in such sense to increase the gain thereof and responsive to said second fluidic logic signal for applying said analog fluid signal to said amplifier in such sense to decrease the gain thereof.

5. In a fluidic amplifier circuit having an analog fluidic amplifier for providing a fluid output signal as a function of at least one of a plurality of the fluid input signals and responsive to a fluid command signal for varying said function, said plurality of fluid input signals each having a predetermined parameter, the predetermined parameter being independently varying for each fluid input signal;

control means responsive to at least two of said fluid input signals and their predetermined parameters for providing a binary fluid signal having a first state in response to a predetermined relationship between the predetermined parameters of said at least two fluid input signals and having a second state in the absence of said predetermined relationship between the predetermined parameters of said at least two fluid input signals;

means for applying said binary fluid signal when in first state to said amplifier as said fluid command signal;

wherein said control means includes means for deriving a first derivative signal for each of said two input signals, each first derivative signal having an amplitude proportional to the first derivative with respect to time of the amplitude of the corresponding input signal; and wherein said predetermined parameter is the first derivative with respect to time of said fluid input signals, and wherein said predetermined relationship between the predetermined parameter of said at least two fluid input signals comprises both of the first derivatives with respect to time of said at least two fluid input signals having the same polarity.

6. The combination according to claim 5 wherein said control means comprises:

means responsive to a first of said at least two fluid input signals for providing a first fluid logic signal whenever the first derivative with respect to time of said first fluid input signal is of a positive polarity and for providing a second fluid logic signal whenever the first derivative with respect to time of said first fluid input signal is of negative polarity;

means responsive to the second of said at least two fluid input signals for providing a third fluid logic signal whenever the first derivative with respect to time of said second fluid input signal is of positive polarity and for providing a fourth fluid logic signal whenever the first derivative with respect to time of said second fluid input signal is of negative polarity;

first fluidic logic means responsive to time coincidence of said first and third fluid logic signals for providing a fifth fluid logic signal indicative of the first derivative with respect to time of both said first and second fluid input signals having positive polarity;

second fluidic logic means responsive to time coincidence of said second and fourth fluid logic signals for providing sixth fluid logic signal indicative of the first derivative with respect to time of both said first and second fluid input signals having negative polarities;

third fluidic logic means responsive to time coincidence of said fifth and sixth fluid logic signals for providing said binary fluid signal at said fluid command signal.

7. In a fluidic amplifier circuit having an analog fluidic amplifier for providing a fluid output signal as a function of at least one of a plurality of the fluid input signals and responsive to a fluid command signal for varying said function, said plurality of fluid input signals each having a predetermined parameter, the predetermined parameter being independently varying for each fluid input signal;

control means responsive to at least two of said fluid input signals and their predetermined parameters for providing a binary fluid signal having a first state in response to a predetermined relationship between the predetermined parameters of said at least two fluid input signals and having a second state in the absence of said predetermined relationship between the predetermined parameters of said at least two fluid input signals;

means for applying said binary fluid signal when in said first state to said amplifier as said fluid command signal;

wherein said control means includes means for deriving a first derivative signal for each of said two input signals, each first derivative signal having an amplitude proportional to the first derivative with respect to time of the amplitude of the corresponding input signal; and wherein said predetermined parameter is the first derivative with respect to time of said fluid input signal, and wherein said predetermined relationship between the predetermined parameter of said at least two fluid input signals comprises both of the first derivatives with respect to time of said at least two fluid input signals having zero or different polarities.

8. The combination according to claim 7 wherein said control means comprises:

means responsive to a first of said at least two fluid input signals for providing a first fluid logic signal whenever the first derivative with respect to time of said first fluid input signal is of positive polarity and for providing a second fluid logic signal whenever the first derivative with respect to time of said first fluid input signal is of negative polarity;

means responsive to the second of said at least two fluid input signals for providing a third fluid logic signal whenever the first derivative with respect to time of said second fluid input signal is of positive polarity and for providing a fourth fluid logic signal whenever the first derivative with respect to time of said second fluid input signal is of negative polarity;

first fluidic logic means responsive to time coincidence of said first and third fluid logic signals for providing a fifth fluid logic signal indicating that the first derivative with respect to time of both said first and second fluid input signals is of positive polarity;

second fluidic logic means responsive to time coincidence of said second and fourth fluidic logic signals for providing a sixth fluid logic signal indicating that the first derivative with respect to time of both said first and second fluid input signal is of negative polarity;

third fluidic logic means responsive to the absence of time coincidence between said fifth and sixth fluidic logic signals for providing said binary fluid signal as said fluid command signal.

9. A fluidic amplifier circuit having an analog amplifier for providing a fluid output signal as a function of at least one of a plurality of fluid input signals and responsive to a fluid command signal for varying said function, said plurality of fluid input signals each having a predetermined parameter, the predetermined parameter being independently variable for each fluid input signal, said circuit comprising:

control means responsive to at least two of said input signals for comparing their predetermined parameters and for providing a fluid control signal having an amplitude which varies as a function of the difference between the predetermined parameters of said at least two of said fluid input signals;

means for applying said fluid control signal to said proportional fluidic amplifier as said fluid command signal;

wherein said control means includes means for deriving a first derivative signal for each of said two input signals, each first derivative signal having an amplitude proportional to the first derivative with respect to time of the amplitude of the corresponding input signal; and wherein said predetermined parameter is the average time during which the first derivative with respect to time of said fluid input signals are of the same polarity.

10. The combination according to claim 9 wherein said control means comprises:

means responsive to a first of said at least two fluid input signals for providing a first fluid logic signal whenever the first derivative with respect to time of said first fluid input signal is of positive polarity and for providing a second fluid logic signal for whenever the first derivative with respect to time of said first fluid input signal is of negative polarity;

means responsive to the second of said at least two fluid input signals for providing a third fluid logic signal whenever the first derivative with respect to time of said second fluin input signal is of positive polarity and for providing a fourth fluid logic signal whenever the first derivative with respect to time of said second fluid input signal is of negative polarity;

first fluidic logic means responsive to time coincidence of said first and third fluid logic signals for providing a fifth fluid logic signal indicating that the first derivatives with respect to time of both said first and second fluid input signals is of positive polarity;

second fluid logic means responsive to time coincidence of said second and fourth fluid logic signals for providing a sixth fluid logic signal indicating that the first derivative with respect to time of both said first and second fluid input signals is of negative polarity;

third fluidic logic means responsive to the absence of time coincidence of said fifth and sixth fluid logic signals for providing a seventh fluid logic signal;

11. A fluidic amplifier circuit having an analog amplifier for providing a fluid output signal as a function of at least one of a plurality of fluid input signals and responsive to a fluid command signal for varying said function, said plurality of fluid input signals each having a predetermined parameter, the predetermined parameter being independently variable for each fluid input signal, said circuit comprising:

control means responsive to at least two of said input signals for comparing their predetermined parameters and for providing a fluid control signal having an amplitude which varies as a function of the difference between the predetermined parameters of said at least two of said fluid input signals;

means for applying said fluid control signal to said proportional fluidic amplifier as said fluid command signal;

wherein said control means includes means for deriving a first derivative signal for each of said two input signals, each first derivative signal having an amplitude proportional to the first derivative with respect to time of the amplitude of the corresponding input signal; and wherein said predetermined parameter is the average time during which the first derivatives with respect to time of said fluid input signals are of different polarity or zero.

12. In combination:

a variable-gain analog fluidic amplifier of the stream-interaction type having means for issuing a power stream of fluid;

control means for deflecting said stream of fluid in a first sense in response to a first fluid input signal and in a second sense in response to a second fluid input signal;

and at least one output passage for receiving portions of said power stream as a function of power stream deflection;

and first gain control means for varying the gain of said amplifier in response to variations in a predetermined parameter of said first fluid input signal;

wherein said first gain control means comprises means for varying the flow impedance of said output passage as a function of a predetermined parameter of said first input signal;

the combination further comprising:

second gain control means for varying the pressure of said power stream as a predetermined parameter of said second input signal.

13. The combination according to claim 12 wherein said predetermined parameter of said first input signal is the same as said predetermined parameter of said second input signal.

14. A fluidic circuit for processing a fluid input signal, said circuit comprising:

variable gain fluidic means for receiving said fluid input signal and providing a fluid output signal having an amplitude which varies as a function of the amplitude of said fluid input signal, said variable gain fluidic means including means for receiving a fluid gain control signal and varying said function in accordance with the amplitude of said gain control signal; and fluidic gain control means comprising:

first means for receiving said fluid input signal;

second means for providing a further fluid signal having an amplitude proportional to the average amplitude of said fluid input signal;

third means responsive to said further fluid signal and said fluid input signal for providing said third gain control signal at an amplitude proportional to the amount by which the amplitude of said fluid input signal exceeds the amplitude of said further fluid signal; and fourth means for applying said third gain control signal to said variable gain fluidic means.

15. A fluidic circuit for processing a fluid input signal, said circuit comprising:

variable gain fluidic means for receiving said fluid input signal and providing a fluid output signal having an amplitude which varies as a function of the amplitude of said fluid input signal, said variable gain fluidic means including means for receiving a fluid gain control signal and varying said function in accordance with the amplitude of said gain control signal; and fluidic gain control means comprising:
 first means for receiving said fluid input signal;
 second means for providing a further fluid signal having an amplitude proportional to the average amplitude of said fluid input signal;
 third means responsive to said further fluid signal and said fluid input signal for providing said fluid gain control signal at an amplitude proportional to the amount by which the amplitude of said further fluid signal exceeds the amplitude of said fluid input signal; and
 fourth means for applying said fluid gain control signal to said variable gain fluidic means.

16. A fluidic circuit for processing a fluid input signal, said circuit comprising:
 variable gain fluidic means for receiving said fluid input signal and providing a fluid output signal having an amplitude which varies as a function of the amplitude of said fluid input signal, said variable gain fluidic means including means for receiving a fluid gain control signal and varying said function in accordance with the amplitude of said gain control signal; and
 fluidic gain control means comprising:
  first means for receiving said fluid input signal;
  second means for providing a further fluid signal having an amplitude proportional to the average amplitude of said fluid input signal;
  third means responsive to said further fluid signal and said fluid input signal for providing said fluid gain control signal at an amplitude proportional to the difference between the amplitudes of said fluid input signal and said further fluid signal; and
  fourth means for applying said fluid gain control signal to said variable gain fluidic means.

17. The circuit according to claim 16 wherein said variable gain fluidic means comprises a proportional fluidic amplifier of the type wherein a power stream of fluid is deflected relative to at least one power stream outlet passage by said fluid input signal, said variable gain fluidic means comprising: a control port for receiving said gain control signal and issuing a corresponding fluid stream generally perpendicular to and in deflecting relationship with said power stream.

18. The circuit according to claim 16 wherein said variable gain fluidic means comprises a proportional fluidic amplifier of the type wherein a power stream of fluid is deflected relative to at least one power stream outlet passage by said fluid input signal, said variable gain fluidic means comprising: means for issuing said gain control signal into said outlet passage in impeding relation to said power stream.

19. The circuit according to claim 16 wherein said variable gain fluidic means comprises a proportional fluidic amplifier of the type wherein a power stream of fluid is deflected relative to at least one power stream outlet passage by said fluid input signal, said variable gain fluidic means comprising: means for issuing said gain control signal into said fluidic amplifier as said power stream.

20. The fluidic circuit according to claim 16 wherein:
 said second means comprises a fluidic capacitor arranged to receive said fluid input signal; and
 said third means comprises an analog fluidic amplifier connected to receive said further fluid signal and said fluid input signal as a differential pressure signal.

21. A fluidic circuit for processing a fluid input signal, said circuit comprising:
 variable gain fluidic means for receiving said fluid input signal and providing a fluid output signal having an amplitude which varies as a function of the amplitude of said fluid input signal, said variable gain fluidic means including means for receiving a fluid gain control signal and varying said function in accordance with the amplitude of said gain control signal; and
 fluidic gain control means comprising:
  first means for receiving said fluid input signal;
  second means for providing a first fluid signal having an amplitude proportional to the average amplitude of said fluid input signal;
  third means responsive to said first fluid signal and said fluid input signal for providing a second fluid signal at an amplitude proportional to the difference between the amplitudes of said fluid input signal and said first fluid signal;
  fourth means for providing said fluid gain control signal at an amplitude proportional to the average amplitude of said second fluid signal; and
  fifth means for applying said fluid gain control signal to said variable gain fluidic means.

22. The circuit according to claim 21 wherein said variable gain fluidic means comprises a proportional fluidic amplifier of the type wherein a power stream of fluid is deflected relative to at least one power stream outlet passage by said fluid input signal, said variable gain fluidic means comprising: a control port for receiving said gain control signal and issuing a corresponding fluid stream generally perpendicular to and in deflecting relationship with said power stream.

23. The fluidic circuit according to claim 21 wherein:
 said second fluidic means comprises a first fluid capacitor;
 said third fluid means comprising: an analog fluidic amplifier connected to receive said fluid input signal and said further fluid signal as a differential pressure signal and having a pair of outlet passages for providing an amplified version of said differential pressure signal; and a fluidic maximum pressure selector for providing said second fluid signal as a single pressure signal of amplitude proportional to the higher of the two pressures in said pair of outlet passages; and
 said fourth means comprises a second fluidic capacitor.

24. A fluidic circuit for processing a fluid input signal, said circuit comprising:
 variable gain fluidic means for receiving said fluid input signal and providing a fluid output signal having an amplitude which varies as a function of the amplitude of said fluid input signal, said variable gain fluidic means including means for receiving a fluid gain control signal and varying said function in accordance with the amplitude of said gain control signal; and fluidic gain control means comprising:
  first means for receiving said fluid input signal;
  second means for providing a first fluid signal having an amplitude proportional to a predetermined characteristic of said fluid input signal;
  third means responsive to said first fluid signal and said fluid input signal for providing a fluid control pulse each time the difference between the amplitudes of said fluid input signal and said first fluid signal exceeds a predetermined level;
  fourth means for providing a train of fluid reference pulses at a constant frequency generally equal to the nominal frequency of said fluid control pulses;
  fifth means for providing said fluid gain control signal at an amplitude proportional to the difference between the frequencies of said fluid reference pulses and said fluid control pulses; and
  sixth means for applying said fluid gain control signal to said variable gain fluidic means.

25. The fluidic circuit according to claim 24 wherein said predetermined characteristic is the average amplitude of said fluid input signal.

26. A fluid circuit for processing a fluid input signal, said circuit comprising:
  variable gain fluidic means for receiving said fluid input signal and providing a fluid output signal having an amplitude which varies as a function of the amplitude of said fluid input signal, said variable gain fluidic means including means for receiving a fluid gain control signal and varying said function in accordance with the amplitude of said gain control signal, and
  fluidic gain control means comprising:
    first means for receiving said fluid input signal;
    second means for providing said gain control with an amplitude proportional to the rate of change of the amplitude of said fluid input signal with respect to time;
    means for applying said gain control signal to said variable gain fluidic means.

27. The fluidic circuit according to claim 26 wherein the amplitude of said gain control signal is proportional to the rate of increase of the amplitude of said fluid input signal with respect to time.

28. The fluidic circuit according to claim 26 wherein the amplitude of said gain control signal is proportional to the rate of decrease of the amplitude of said fluid input signal with respect to time.

29. The fluidic circuit according to claim 26 wherein said second means comprises:
  a fluidic element including: first and second input passages and at least one output passage for providing said gain control signal as a proportional function of the amplitude difference between fluid signals applied to said input passage;
  means for applying said fluid input signal directly to said first input passage; and
  delay means for applying a delayed version of said fluid input signal to said second inlet passage.

30. The circuit according to claim 26 wherein said variable gain fluidic means comprises a proportional fluidic amplifier of the type wherein a power stream of fluid is deflected relative to at least one power stream outlet passage by said fluid input signal, said variable gain fluidic means comprising: a control port for receiving said gain control signal and issuing a corresponding fluid stream generally perpendicular to and in deflecting relationship with said power stream.

31. The circuit according to claim 26 wherein said variable gain fluidic means comprises a proportional fluidic amplifier of the type wherein a power stream of fluid is deflected relative to at least one power stream outlet passage by said fluid input signal, said variable gain fluidic means comprising: means for issuing said gain control signal into said outlet passage in impeding relation to said power stream.

32. The circuit according to claim 26 wherein said variable gain fluidic means comprises a proportional fluidic amplifier of the type wherein a power stream of fluid is deflected relative to at least one power stream outlet passage by said fluid input signal, said variable gain fluidic means comprising: means for issuing said gain control signal into said fluidic amplifier as said power stream.

33. A fluidic circuit for processing a fluid input signal, said circuit comprising:
  variable gain fluidic means for receiving said fluid input signal and providing a fluid output signal having an amplitude which varies as a function of the amplitude of said fluid input signal, said variable gain fluidic means including means for receiving a fluid gain control signal and varying said function in accordance with the amplitude of said gain control signal; and
  fluidic gain control means comprising:
    first means for receiving said fluid input signal;
    second means for providing a further fluid signal having an amplitude proportional to the rate of change of the amplitude of said fluid input signal with respect to time;
    third means responsive to said further fluid signal for providing said third gain control signal at a first amplitude when the amplitude of said further fluid signal is below a predetermined level and for providing said fluid gain control signal at a second amplitude when the amplitude of said further fluid signal equals and exceeds a predetermined level; and
    fourth means for applying said fluid gain control signal to said variable gain fluidic means.

34. The circuit according to claim 33 wherein said variable gain fluidic means comprises a proportional fluidic amplifier of the type wherein a power stream of fluid is deflected relative to at least one power stream outlet passage by said fluid input signal, said variable gain fluidic means comprising: a control port for receiving said gain control signal and issuing a corresponding fluid stream generally perpendicular to and in deflecting relationship with said power stream.

35. The circuit according to claim 33 wherein said variable gain fluidic means comprises a proportional fluidic amplifier of the type wherein a power stream of fluid is deflected relative to at least one power stream outlet passage by said fluid input signal, said variable gain fluidic means comprising: means for issuing said gain control signal into said outlet passage in impeding relation to said power stream.

36. A fluidic circuit for processing a fluid input signal, said circuit comprising:

variable gain fluidic means for receiving said fluid input signal and providing a fluid output signal having an amplitude which varies as a function of the amplitude of said fluid input signal, said variable gain fluidic means including means for receiving a fluid gain control signal and varying said function in accordance with the amplitude of said gain control signal; and fluidic gain control means comprising:
  means for receiving said fluid input signal;
  means for providing said gain control with an amplitude proportional to the Nth derivative with respect to time of the amplitude of said fluid input signal, where n is a positive integer; and
  means for applying said fluid gain control signal to said variable gain fluidic means.

37. A fluidic circuit for processing a first fluid input signal in accordance with variations in said first input signal and a second mutually independent input signal, said circuit comprising:

variable gain fluidic means for receiving said fluid input signal and providing a fluid output signal having an amplitude which varies as a function of the amplitude of said first fluid input signal, said variable gain fluidic means including means for receiving a fluid gain control signal and varying said function in accordance with the amplitude of said gain control signal; and fluidic gain control means comprising:
  first means for receiving said fluid input signals;
  second means for providing a further fluid signal when the amplitudes of said first and second input signals are converging; and
  third means for applying said further fluid signal as said fluid gain control signal to said variable gain fluidic means.

38. A fluidic circuit for processing a first fluid input signal in accordance with variations in said first input signal and a second mutually independent input signal, said circuit comprising:

variable gain fluidic means for receiving said fluid input signal and providing a fluid output signal having an amplitude which varies as a function of the amplitude of said first fluid input signal, said variable gain fluidic means including means for receiving a fluid gain control signal and varying said function in accordance with the amplitude of said gain control signal; and fluidic gain control means comprising:
  first means for receiving said fluid input signals;
  second means for providing a further fluid signal when the amplitudes of said first and second signals are diverging; and
  third means for applying said further fluid signal as said gain control signal to said variable gain fluidic means.

39. A fluidic circuit for processing a first fluid input signal in accordance with variations in said first input signal and a second mutually independent input signal, said circuit comprising:

variable gain fluidic means for receiving said fluid input signal and providing a fluid output signal having an amplitude which varies as a function of the amplitude of said first fluid input signal, said variable gain fluidic means including means for receiving a fluid gain control signal and varying said function in accordance with the amplitude of said gain control signal; and fluidic gain control means comprising:
  first means for receiving said fluid input signals;
  second means for providing said gain control signal with an amplitude proportional to the rate with respect to time at which the amplitude of said first input signal is increasing relative to the amplitude of said second input signal; and
  means for applying said fluid gain control signal to said variable gain fluidic means.

40. A fluidic circuit for processing a first fluid input signal in accordance with variations in said first input signal and a second mutually independent input signal, said circuit comprising:

variable gain fluidic means for receiving said fluid input signal and providing a fluid output signal having an amplitude which varies as a function of the amplitude of said first fluid input signal, said variable gain fluidic means including means for receiving a fluid gain control signal and varying said function in accordance with the amplitude of said gain control signal; and fluidic gain control means comprising:
  first means for receiving said fluid input signals;
  second means for providing said gain control signal at an amplitude proportional to the rate with respect to time at which the amplitude of said second input signal is increasing relative to the amplitude of said first input signal; and
  means for applying said fluid gain control signal to said variable gain fluidic means.

41. A fluidic circuit for processing a first fluid input signal in accordance with variations in said first input signal and a second mutually independent input signal, said circuit comprising:

variable gain fluidic means for receiving said fluid input signal and providing a fluid output signal having an amplitude which varies as a function of the amplitude of said first fluid input signal, said variable gain fluidic means including means for receiving a fluid gain control signal and varying said function in accordance with the amplitude of said gain control signal; and fluidic gain control means comprising:
  first means for receiving said fluid input signals;
  second means for providing said gain control signal at an amplitude proportional to the frequency difference between said first and second input signals; and
  means for applying said fluid gain control signal to said variable gain fluidic means.

* * * * *